(12) United States Patent
Liberg et al.

(10) Patent No.: US 12,495,343 B2
(45) Date of Patent: Dec. 9, 2025

(54) SERVICE LINK SWITCHING IN A WIRELESS COMMUNICATIONS NETWORK

(71) Applicant: Telefonaktiebolaget LM Ericsson (publ), Stockholm (SE)

(72) Inventors: Olof Liberg, Enskede (SE); Xingqin Lin, San Josè, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 458 days.

(21) Appl. No.: 17/910,874

(22) PCT Filed: Mar. 10, 2021

(86) PCT No.: PCT/SE2021/050208
§ 371 (c)(1),
(2) Date: Sep. 12, 2022

(87) PCT Pub. No.: WO2021/183030
PCT Pub. Date: Sep. 16, 2021

(65) Prior Publication Data
US 2023/0128255 A1 Apr. 27, 2023

Related U.S. Application Data

(60) Provisional application No. 62/989,119, filed on Mar. 13, 2020.

(51) Int. Cl.
*H04W 36/08* (2009.01)
*H04B 7/185* (2006.01)

(52) U.S. Cl.
CPC ...... *H04W 36/083* (2023.05); *H04B 7/18541* (2013.01)

(58) Field of Classification Search
CPC .............. H04B 7/18541; H04B 7/2041; H04B 7/0695; H04W 36/083; H04W 36/0072
See application file for complete search history.

(56) References Cited

U.S. PATENT DOCUMENTS

2016/0323032 A1* 11/2016 Ulupinar .............. H04B 7/2041
2017/0041830 A1* 2/2017 Davis .................... H04B 7/1851
(Continued)

OTHER PUBLICATIONS

International Search Report and Written Opinion of the International Searching Authority for PCT International Application No. PCT/SE2021/050208 dated May 27, 2021.
(Continued)

*Primary Examiner* — Fred A Casca
(74) *Attorney, Agent, or Firm* — Sage Patent Group

(57) ABSTRACT

A method performed by a first network entity associated with a first airborne or orbital communication node for enabling at least one wireless device in a wireless communications network to switch from being served by a first service link of the first airborne or orbital communication node to being served by a second service link of a second airborne or orbital communication node, is provided. The method comprises transmitting, to the at least one wireless device, information associated with a reference signal of a transmission beam transmitted over the second service link of the second airborne or orbital communication node, comprising information indicating the location over time of the second airborne or orbital communication node. A first network entity, a wireless device and method therein are also provided, as well as, computer programs and carriers.

20 Claims, 13 Drawing Sheets

(56) References Cited

U.S. PATENT DOCUMENTS

2022/0210812 A1* 6/2022 Matsumura ........... H04W 72/23
2022/0295359 A1* 9/2022 Höhne ............ H04W 36/00837

OTHER PUBLICATIONS

Kim Jihyung et al., "Beam Management for 5G Satellite Systems Based on NR," 2020 International Conference On Information Networking (ICOIN), IEEE, Jan. 7, 2020, pp. 32-34.
3GPP TR 38.821 V16.0.0, "3rd Generation Partnership Project; Technical Specification Group Radio Access Network; Solutions for NR to support non-terrestrial networks (NTN), (Release 16)," Dec. 2019, 140 pages.
MediaTek Inc., "New Study WID on NB-loT/eTMC support for NTN," RP-193235, 3GPP TSG RAN Meeting #86, Sitges, Spain, Dec. 9-31, 2019, 4 pages.
3GPP TR 38.811 V15.0.0, "3rd Generation Partnership Project; Technical Specification Group Radio Access Network; Study on New Radio (NR) to support non terrestrial networks (Release 15)," Jun. 2018, 13 pages.
Thales, "Solutions for NR to support non-terrestrial networks (NTN)," RP-193234, 3GPP TSG RAN meeting #86, Sitges, Spain, Dec. 9-13, 2019, 10 pages.
3GPP TS 38.331 V16.0.0, "3rd Generation Partnership Project; Technical Specification Group Radio Access Network; NR; Radio Resource Control (RRC) protocol specification (Release 16)," Mar. 2020, 835 pages.

* cited by examiner

SERVICE LINK SWITCHING IN A WIRELESS COMMUNICATIONS NETWORK

CROSS REFERENCE TO RELATED APPLICATIONS

This application is a 35 U.S.C. § 371 national stage application of PCT International Application No. PCT/SE2021/050208 filed on Mar. 10, 2021, which claims the benefit of U.S. Provisional Patent Application Ser. No. 62/989,119, filed on Mar. 13, 2020, the disclosures and content of which are incorporated by reference herein in their entireties.

TECHNICAL FIELD

Embodiments herein relate to service link switching in a wireless communications network. In particular, embodiments herein relate to switching a wireless device from being served by a first service link of a first airborne or orbital communication node to being served by a second service link of a second airborne or orbital communication node.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations or wireless access points providing radio coverage over at least one respective geographical area forming a cell. This may be referred to as a Radio Access Network, RAN. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station in the RAN. Commonly, the wireless devices transmit data over an air or radio interface to the radio base stations in uplink, UL, transmissions and the radio base stations transmit data over an air or radio interface to the wireless devices in downlink, DL, transmissions.

In 3GPP Release 8, the Evolved Packet System, EPS, was specified. EPS is based on the Long-Term Evolution, LTE, radio network and the Evolved Packet Core, EPC. It was originally intended to provide voice and mobile broadband, MBB, services but has continuously evolved to broaden its functionality. Since Release 13 NB-IoT and LTE for machine type communication, LTE-M, are part of the LTE specifications and provide connectivity to massive machine type communications, mMTC, services.

In 3GPP Release 15, the first release of the 5G system, 5GS, was specified. This is a new generation's radio access technology intended to serve use cases such as enhanced mobile broadband (eMBB), ultra-reliable and low latency communication (URLLC) and mMTC. 5G includes the New Radio, NR, access stratum interface and the 5G Core Network, 5GC. The NR physical and higher layers are reusing parts of the LTE specification, and to that add needed components when motivated by new use cases. One such component is the introduction of a sophisticated framework for beam forming and beam management to extend the support of the 3GPP technologies to a frequency range going beyond 6 GHz.

In Release 15, 3GPP started the work to prepare NR for operation in Non-Terrestrial Networks, NTN. NTN is a network typology where network nodes, such as, e.g. base stations, base station repeaters and base station relays, are aerial and in full or in part located in flying vehicles, such as, satellites, High-Altitude Platforms (HAPS), or drones. This type of aerial network nodes may be referred to hereinafter as airborne or orbital communications nodes. The work was performed within the study item "NR to support Non-Terrestrial Networks" and resulted in TR 38.811, v15.0.0. In Release 16, the work to prepare NR for operation in an NTN network continued with the study item "Solutions for NR to support Non-Terrestrial Network", TR 38.821, v16.0.0. In parallel, the interest to adapt NB-IoT and LTE-M for operation in NTN is growing. As a consequence, 3GPP Release 17 contains both a work item on NR NTN (e.g. 3GPP RAN #86, RP-193234, "Solutions for NR to support non-terrestrial networks (NTN)") and a study item on NB-IoT and LTE-M support for NTN (e.g. 3GPP RAN #86, RP-193235 "Study on NB-IoT/eMTC support for Non-Terrestrial Network").

Different NTN Scenarios

The Next Generation Radio Access Network, NG-RAN, logical architecture as described in the standard document 3GPP TS 38.401 may be used as baseline for NTN scenarios.

FIG. 1 shows one example of an NTN 100 comprising a transparent satellite-based NG-RAN architecture. In this case, the airborne or orbital communications node 101 implements, i.e. is configured to perform, frequency conversion and an RF amplifier in both the UL and DL direction. In other words, the airborne or orbital communications node 101 corresponds here to an RF repeater. This means that the airborne or orbital communications node 101 repeats the NR-Uu radio interface from the feeder link, i.e. the radio link between the NTN gateway and the airborne or orbital communications node 101, to the service link, i.e. the radio link between the airborne or orbital communications node 101 and the UEs, and vice versa. Further, more than one gNB may access a single airborne or orbital communications node 101. Also, in this case, the NTN gateway and the airborne or orbital communications node 101 may be seen as a remote radio unit, RRU, within the Radio Access Network, RAN, of the NTN. Furthermore, in the NTN, the gNB may communicate with the core network, 5G CN, over a NG interface, whereby the core network may communicate with a data network over a N6 interface. It should further be noted that the Satellite Radio Interface, SRI, on the feeder link here transports the NR-Uu. The SRI is the transport link between NTN GW and airborne or orbital communications node 101. In other words, the airborne or orbital communications node 101 does not terminate NR-Uu.

FIG. 2 shows one example of an NTN 100 comprising a regenerative satellite-based NG-RAN architecture. In this case, the airborne or orbital communications node 101 may implement gNB processing and regeneration of the signals received from earth. Here, the NR-Uu radio interface is only employed on the service link between the UE and the airborne or orbital communications node 101, whereas the feeder link between the NTN gateway and the airborne or orbital communications node 101 employ or transport NG over its SRI. Also, in this case, the airborne or orbital communications nodes 101, 102 with the gNB processing payloads may be seen as the RAN of the NTN. The airborne or orbital communications nodes 101, 102 also provides Inter-Satellite Links, ISLs, between themselves. ISL is a transport link between satellites, and it may, for example, be a radio interface or an optical interface.

FIG. 3 shows another example of an NTN 100 comprising a regenerative satellite-based NG-RAN architecture. However, in this case, the airborne or orbital communications node 101 may implement gNB-Distributed Unit, gNB-DU, processing and regeneration of the signals received from earth. Here, the NR-Uu radio interface is on the service link between the airborne or orbital communications node 101 and the UE. The SRI on the feeder link between the NTN gateway and the airborne or orbital communications node 101 may here transport the F1 interface. The airborne or orbital communications node 101 may also provide ISLs between airborne or orbital communications nodes. The gnB-DUs on-board different airborne or orbital communications nodes may be connected to the same gNB-Centralized Unit, gNB-CU, on the ground. If the airborne or orbital communications node 101 hosts more than one gNB-DU, the same SRI may transport all the corresponding F1 interface instances.

In FIGS. 1-3, the airborne or orbital communications node 101 may refer to a satellite or, in particular, to a satellite payload comprising wireless communications equipment, such as, antennas, transmitters, receivers, etc.

NR Beam Management

To overcome the challenging propagation conditions in Frequency Range 2 (FR2), i.e. frequency bands from 24.25 GHz to 52.6 GHz, New Radio, NR, supports advanced beamforming techniques. Important pillars in the overall NR beamforming technology are the concepts of Quasi Co-Location, QCL, and Transmission Configuration Indication, TCI. The QCL concept was originally specified for Long-Term Evolution, LTE, and is evolved in the NR specifications.

In regards to QCL, to enable a receiver to infer the channel over which a first symbol, transmitted from a first antenna port, is conveyed, from the channel over which a second symbol, transmitted from a second antenna port, is conveyed, a UE may assume that the two antenna ports are Quasi Co-Located, QCL. Generally, several signals may be transmitted from the same base station physical antenna from different antenna ports. These signals may share the same large-scale properties, e.g. in terms of Doppler shift/spread, average delay spread, or average delay. These antenna ports are then said to be quasi co-located. A technical specification may determine, or a network may signal to a UE, that two antenna ports are QCL. If the UE knows that two antenna ports are QCL with respect to a certain parameter the UE can estimate that parameter based on a source signal transmitted from a first antenna port and use that estimate when receiving a target signal from a second antenna port. Typically, the first antenna port is represented by a measurement Reference Signal, RS, such as Channel State Information Reference Signal, CSI-RS, and the second antenna port is represented by a Demodulation Reference Signal, DMRS. For instance, if antenna ports A and B are QCL with respect to average delay, the UE can estimate the average delay from the source RS received from antenna port A, and assume that the target RS received from antenna port B has the same average delay. This a-priori information may be utilized by a UE when demodulating a signal sent from antenna port B.

There are 4 QCL types defined in NR comprising the following channel properties:

QCL-Type A: {Doppler shift, Doppler spread, average delay, delay spread}
QCL-Type B: {Doppler shift, Doppler spread}
QCL-Type C: {Doppler shift, average delay}
QCL-Type D: {Spatial Rx parameter}

NR QCL-Type A is similar to QCL-Type A specified for LTE. QCL-Type B and QCL-Type C include a subset of the channel statistical properties defined for QCL-Type A. One distinct feature of NR compared to LTE is the operation in FR2, which requires highly directional beamformed transmissions and receptions. QCL-Type D is introduced to facilitate beamforming operation in NR FR2. It is associated to the spatial receiver filter, i.e. the receiver beam, configuration used by a UE for receiving NR signals and channels. If a target DMRS of a Physical Downlink Shared Channel, PDSCH, transmission is quasi co-located with a source RS according to QCL-Type D, the UE may use the same spatial receiver filter configuration for receiving both the source RS and the target PDSCH DMRS.

In regards to TCI, the use of the QCL concept in NR has been extended by the introduction of TCI states. A TCI state uses the QCL-Info parameter to configure QCL relationships between up to two downlink reference signals and the DM-RS ports of Physical Downlink Control Channel, PDCCH, and PDSCH transmissions. Each QCL-Info information element identifies one of the downlink reference signals and configures the QCL type associated to it. The reference signal corresponds to a CSI-RS or Synchronization Signal Block, SSB, while the QCL is determined as one of QCL types A-D. The standard specification 3GPP TS 38.331, v.16.0.0 defines the TCI-state information element as follows:

TCI-State Information Element

```
-- ASN1START
-- TAG-TCI-STATE-START
TCI-State ::=                SEQUENCE {
    tci-StateId                  TCI-StateId,
    qcl-Type1                    QCL-Info,
    qcl-Type2                    QCL-Info      OPTIONAL, -- Need R
    ...
}
QCL-Info ::=                 SEQUENCE {
    cell                         ServCellIndex OPTIONAL, -- Need R
    bwp-Id                          BWP-Id OPTIONAL, -- Cond CSI-RS-Indicated
    referenceSignal                 CHOICE {
        csi-rs                       NZP-CSI-RS-ResourceId,
        ssb                          SSB-Index
    },
```

| qcl-Type | ENUMERATED {typeA, typeB, typeC, typeD}, |
| --- | --- |

```
    ...
}
-- TAG-TCI-STATE-STOP
-- ASN1STOP
```

The association between the TCI state and PDSCH transmissions is on a first level defined by a list of available TCI states which is configured for PDSCH by means of Radio Resource Control, RRC, signalling. Each listed TCI state containing QCL type D may be interpreted as a possible PDSCH carrying beam transmitted from the network. A second list is created for PDCCH using a subset of the TCI states configured for PDSCH.

The network may activate one of the listed TCI states to be associated with future PDCCH transmissions, by means of Medium Access Control, MAC, signalling. This effectively quasi co-locates the antenna ports of the source reference signal, identified by the activated TCI state QCL-info, with the target reference signal, i.e. the PDCCH DMRS, antenna ports.

The network may also use MAC signalling to select and activate a sub-set of 8 TCI states from the RRC list that are relevant for future PDSCH transmissions. The wireless device or UE may continuously track and update the channel properties for the active TCI states by measurements and analysis of the source RSs indicated by each TCI state. The actual TCI state to be assumed at PDSCH reception is indicated by means of Physical, PHY, layer Downlink Control Information, DCI, signalling, or is configured to be the same as that used for PDCCH reception. The RRC, MAC and PHY signalling framework as disclosed herein supports a dynamic configuration of TCI states to facilitate dynamic beamforming for PDCCH and PDSCH transmissions.

SUMMARY

A communication satellite, such as, e.g. a first airborne or orbital communication node, typically generates several beams over a given area. The footprint of a beam may be in an elliptic shape, which has been traditionally considered as a cell. The footprint of a beam may also be referred to as a spot beam. The spot beam may move over the earth surface with the satellite movement or may be earth-fixed thanks to some beam pointing mechanism used by the satellite to compensate for its motion. However, at some point, e.g. as the serving satellite approaches the horizon, the service link then needs to switch from the first serving satellite to a second serving satellite. This is illustrated in FIG. 4.

FIG. 4 illustrates service link switching in a wireless communications network 100 in accordance with some embodiments. In particular, FIG. 4 illustrates service link switching in case of having earth-fixed beams. Here, the first airborne or orbital communication node, or satellite A, is serving a UE via the earth-fixed cell or spot beam carrying the service link before the switch. As the first airborne or orbital communication node approaches the horizon, the US has to be switched to be served by a another service link of a second airborne or orbital communication node, or satellite B. The movements of the first and second airborne or orbital communication node, i.e. satellites A and B, are illustrated in FIG. 4 by the vectors v. However, there are currently certain challenges that exists for this type of service link switching.

Various aspects and embodiments of the disclosed technology seek to obviate and/or mitigate problems associated with service link switching in a wireless communications network.

According to a first aspect of embodiments herein, the object is achieved by a method performed by a first network entity associated with a first airborne or orbital communication node for enabling at least one wireless device in a wireless communications network to switch from being served by a first service link of the first airborne or orbital communication node to being served by a second service link of a second airborne or orbital communication node. The method comprises transmitting, to the at least one wireless device, information associated with a reference signal of a transmission beam transmitted over the second service link of the second airborne or orbital communication node, comprising information indicating the location over time of the second airborne or orbital communication node.

According to a second aspect of embodiments herein, the object is achieved by a first network entity associated with a first airborne or orbital communication node for enabling at least one wireless device in a wireless communications network to switch from being served by a first service link of the first airborne or orbital communication node to being served by a second service link of a second airborne or orbital communication node. The first network entity comprises processing circuitry configured to transmit, to the at least one wireless device, information associated with a reference signal of a transmission beam transmitted over the second service link of the second airborne or orbital communication node, comprising information indicating the location over time of the second airborne or orbital communication node.

According to a third aspect of embodiments herein, the object is achieved by a method performed by a wireless device for enabling a switch from being served by a first service link of a first airborne or orbital communication node to being served by a second service link of a second airborne or orbital communication node in a wireless communications network. The method comprising receiving, from a first network entity associated with the first airborne or orbital communication node, information associated with a reference signal of a transmission beam transmitted over the second service link of the second airborne or orbital communication node, comprising information indicating the location over time of the second airborne or orbital communication node.

According to a fourth aspect of embodiments herein, the object is achieved by a wireless device for enabling a switch from being served by a first service link of a first airborne or orbital communication node to being served by a second service link of a second airborne or orbital communication node in a wireless communications network. The wireless device comprises processing circuitry configured to receive, from a first network entity associated with the first airborne or orbital communication node, information associated with a reference signal of a transmission beam transmitted over the second service link of the second airborne or orbital communication node, comprising information indicating the location over time of the second airborne or orbital communication node.

According to a fifth aspect of the embodiments herein, a computer program is also provided configured to perform the method described above. Further, according to a sixth aspect of the embodiments herein, carriers are also provided configured to carry the computer program configured for performing the method described above.

By having a first network entity transmitting information indicating the location over time of the second airborne or orbital communication node to at least one wireless device, the at least one wireless device is able to quickly adjust its receive and transmit beam to point in the direction towards the second airborne or orbital communication node, e.g. a new serving satellite, after a service link switch from the first airborne or orbital communication node, e.g. a current serving satellite. This may thus facilitate efficient service link switching in wireless communications network comprising a Non-Terrestrial Network, NTN. The NTN may, for example, be based on a constellation of Non-Geostationary Satellites, NGSOs, providing earth-fixed cells. Hence, service link switching in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
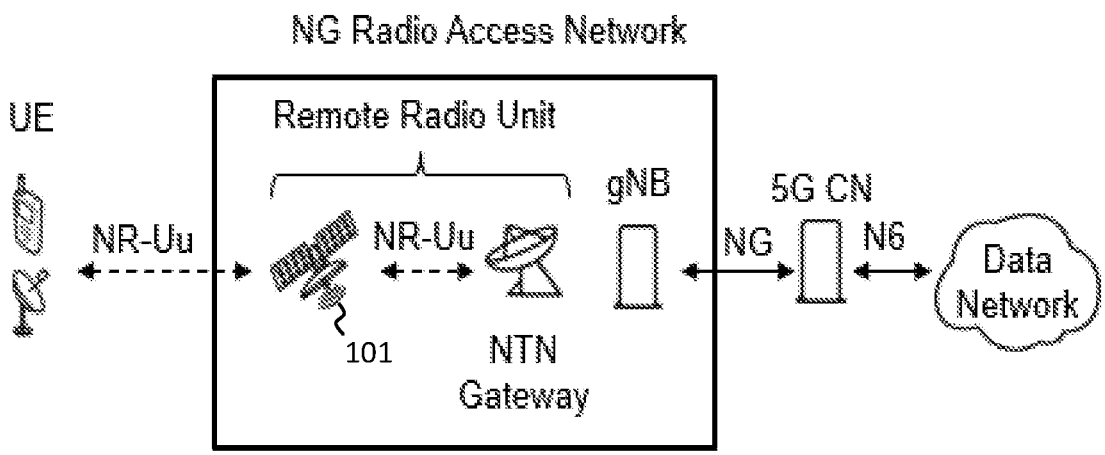
FIG. 1 is a schematic illustration of a an NTN comprising a transparent satellite-based NG-RAN architecture.
Figure 2:
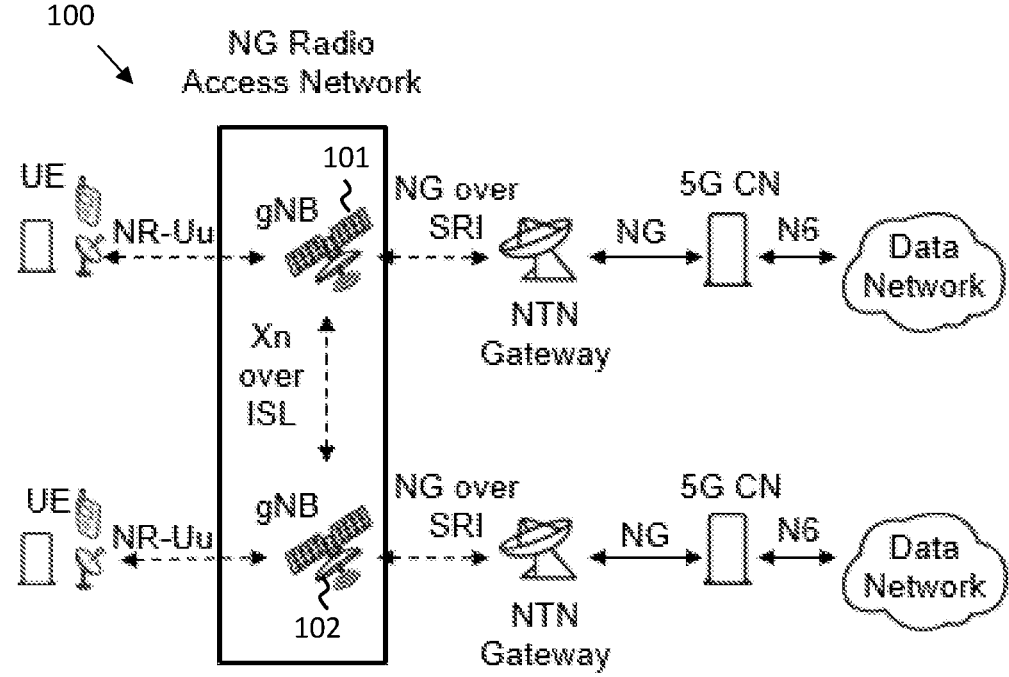
FIG. 2 is a schematic illustration of an NTN comprising a regenerative satellite-based NG-RAN architecture
Figure 3:
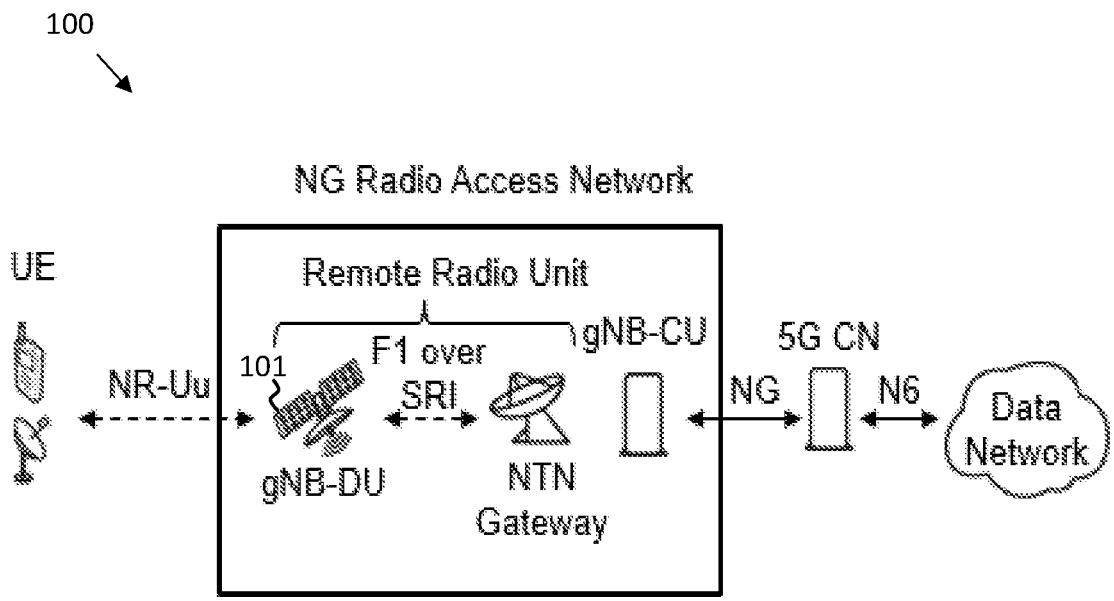
FIG. 3 is another schematic illustration of an NTN comprising a regenerative satellite-based NG-RAN architecture.
Figure 4:
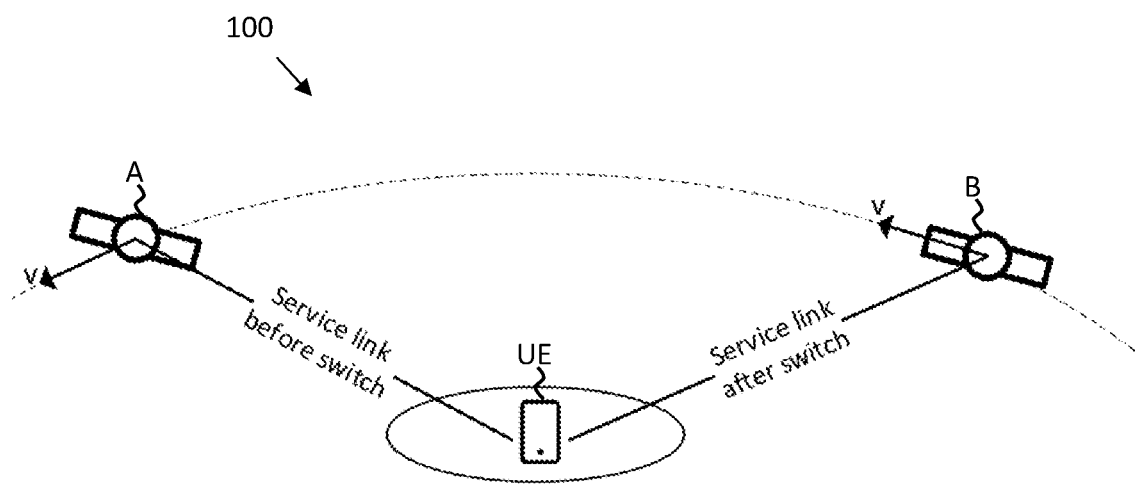
FIG. 4 is a schematic illustration of service link switching in a wireless communications network.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Further, it should be noted that the figures are schematic and simplified for clarity, and they merely show details that are essential to the understanding of the embodiments presented herein, while other details have been left out. Throughout, the same reference numerals are used for identical or corresponding parts or steps.

Figure 5:
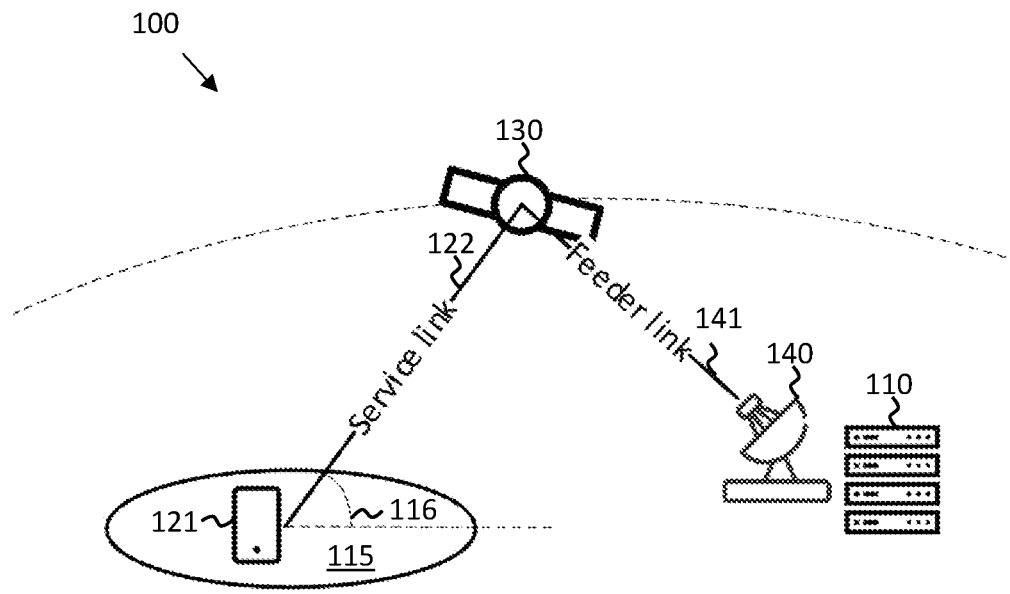
FIG. 5 is a schematic illustration of a wireless communications network in accordance with some embodiments.

FIG. 5 is a schematic illustration of a wireless communications network 100 in accordance with some embodiments. Although, the wireless communications network 100 is exemplified herein as an NTN network, the wireless communications network 100 may also employ technology from any one of LTE, LTE-Advanced, WCDMA, GSM/EDGE, WiMax, UMB, GSM, or any other similar network or system.

The wireless communications network 100 comprise a wireless device 121 and a first network entity 110, 140. The first network entity 110, 140 may comprise a gateway 140 and a network node 110. Here, it may be noted that the network node 110 may correspond to any type of network node or radio network node capable of communicating with the wireless device 121 in the wireless communications network 100, such as, a base station (BS), a radio base station, gNB, eNB, eNodeB, a Home NodeB, a Home eNodeB, a femto Base Station (BS), or a pico BS. Further examples of the network node 110 may be a repeater, multi-standard radio (MSR) radio node such as MSR BS, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), or core network node.

Also, the wireless communications network 100 comprise a first airborne or orbital communication node 130. The first airborne or orbital communication node 130 may be any space-borne platform or flying vehicle, such as, satellites, High-Altitude Platforms (HAPS), drones, etc, comprising network nodes or parts thereof, such as, e.g. base stations, base station repeaters and base station relays.

The first network entity 110, 140 serves the wireless device 121 via a feeder link 141 towards the first airborne or orbital communication node 130 and a first service link, SL, 122 of the first airborne or orbital communication node 130 as the wireless device 121 is located with the cell or spot-beam 115 provided by the first service link 122. FIG. 5 also shows an elevation angle 116 of the first service link 122.

In satellite communications, a satellite radio access network is one type of NTN and usually includes the following components:
- a satellite, e.g. the first airborne or orbital communication node 130 in FIG. 5;
- an earth-based gateway, e.g. gateway 140 in FIG. 5, that connects the satellite to a base station or a core network, e.g. the network node 110 in FIG. 5, depending on the choice of architecture;
- a feeder link that refers to the link between a gateway and a satellite, e.g. the feeder link 140 between the gateway 140 and the first airborne or orbital communication node 130 in FIG. 5; and
- a service link that refers to the link between a satellite and a wireless device, e.g. the first service link 122 between the first airborne or orbital communication node 130 and the wireless device 121 in FIG. 5.

Depending on the orbit altitude, a satellite may be categorized as low earth orbit (LEO), medium earth orbit (MEO), or geosynchronous earth orbit (GSO) satellite. A LEO satellite operates at typical heights ranging from about 250-500 km with orbital periods ranging from about 90-120 minutes. A MEO satellite operates at typical heights ranging from 5,000-25,000 km with orbital periods ranging from about 3-15 hours. A GSO satellite operates at heights about 35,786 km with an orbital period of 24 hours.

In the example architecture in FIG. 5, the wireless communications network 100 comprise a so-called bent pipe satellite network using transparent satellite transponders. In practice, this implies that the satellite transponder corresponds to frequency shifting repeater. The elevation angle of the service link, e.g. the elevation angle 116 of the first service link 122 in FIG. 5, is important as it is related to the distance between the satellite and the wireless device, and also the velocity of the satellite relative to the wireless device.

The wireless device 121 in FIG. 5, or satellite device, is indicated to be a regular handheld device. This applies for at least a subset of the NTN use cases categorized as Mobile Satellite Services, MSS. MSS are commonly associated with voice, text messaging and low data rate services. Fixed Satellite Services, FSS, which are able to offer higher data rates are associated with the use of large antenna aperture devices supporting highly directional antenna beams with beam widths in the order of a degree. However, even though FSS enabled devices have larger antenna aperture as compared to other handheld wireless devices, these FSS enabled devices are often referred to as very small aperture terminals, VSAT, as the aperture is small in a satellite perspective. Besides this, the wireless devices 121 may refer to any type of wireless devices or user equipment (UEs) capable of communicating with the first network entity 110, 140 via the first airborne or orbital communication node 130 in the wireless communications network 100. Examples of such wireless devices may comprise mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication.

Figure 6:
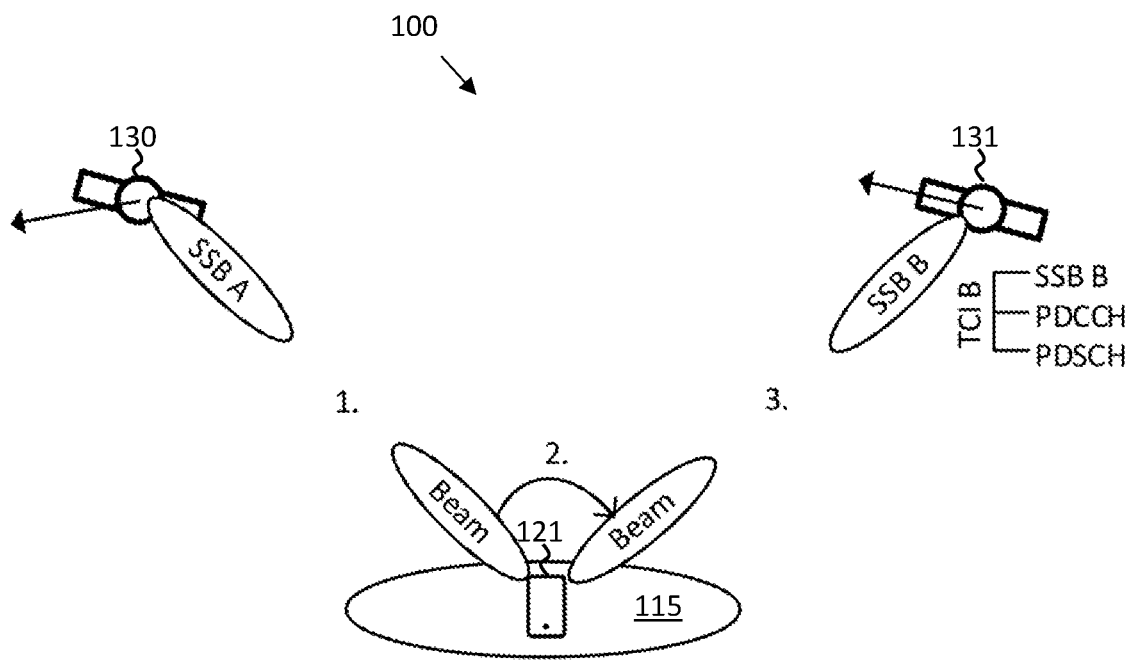
FIG. 6 is a schematic illustration of service link switching in a wireless communications network in accordance with some embodiments.

FIG. 6 illustrates a service link switch supported by TCI configuration and activation. Here, the switching of the service link, in case of NGSO earth fixed beam networks, from a first serving satellite A, i.e. the first airborne or orbital communication node 130, to a second serving satellite B, i.e. a second airborne or orbital communication node 131, may in theory be supported by means of the existing NR beam management procedures as described in the background part above. For example, as shown in FIG. 6, the first serving satellite A may first use its beam A, associated with a first reference signal, e.g. SSB A, to configure the wireless device 121 with a TCI state B associated with a beam B. Secondly, prior to the service link switch, satellite A may then activate TCI state B to support PDCCH and PDSCH reception in beam B. Thirdly, after the link switch and TCI B activation, the wireless device 121 may make use of TCI B and receive a second reference signal, e.g. SSB B, provided by the second serving satellite B, i.e. the second airborne or orbital communication node 131

As part of the developing of the embodiments described herein, it has been realized that there currently exist certain challenges regarding service link switch in wireless communications networks as describe above.

For example, a first problem with the solution shown in FIG. 6 is that a VSAT wireless device, i.e. a wireless device 121 with VSAT capabilities, may not be able to detect the source reference signal, e.g. SSB B, transmitted from satellite B within a reasonable time frame due to its narrow receiver beam width relative to the large scanning range that needs to be swept, i.e. the sky, in the search for the source reference signal. The high velocity of the satellites further complicates the search for the source reference signal associated with the satellite beam. According to another example, a second problem with the solution shown in FIG. 6 is that all devices in an earth-fixed cell in RRC connected mode will be affected by the service link switch. Currently, UE specific signalling is used for activating a TCI state. This is not a very efficient method in this scenario since many UEs are affected by the service link switch.

However, certain aspects of the present disclosure and their embodiments may provide solutions to these or other challenges. The present disclosure relates to an update of the TCI state information element QCL-Info field to include information related to the location and movement of a transmitting network node, i.e. the first and second airborne or orbital communications nodes. In an NTN, this information corresponds to the satellite orbit, which is commonly referred to as the ephemeris. Knowing the location of a satellite will allow a VSAT wireless device served by an NTN to direct its narrow receive beam towards a satellite to quickly detect a source reference signal associated with the satellite beam. Further, the present disclosure relates to the use of multicast or broadcast signalling to perform the activation of the TCI state associated with the satellite beam providing coverage after the service link switch. This will enhance the TCI-state with the ephemeris of the satellite comprising the network node transmitting the source reference signal defined in the QCL-info field.

It should be noted that one important use case of the embodiments herein are for NGSOs in LEO or MEO orbits. However, other use cases may include Unmanned Aircraft System, UAS, platforms or other satellites.

Figure 7:
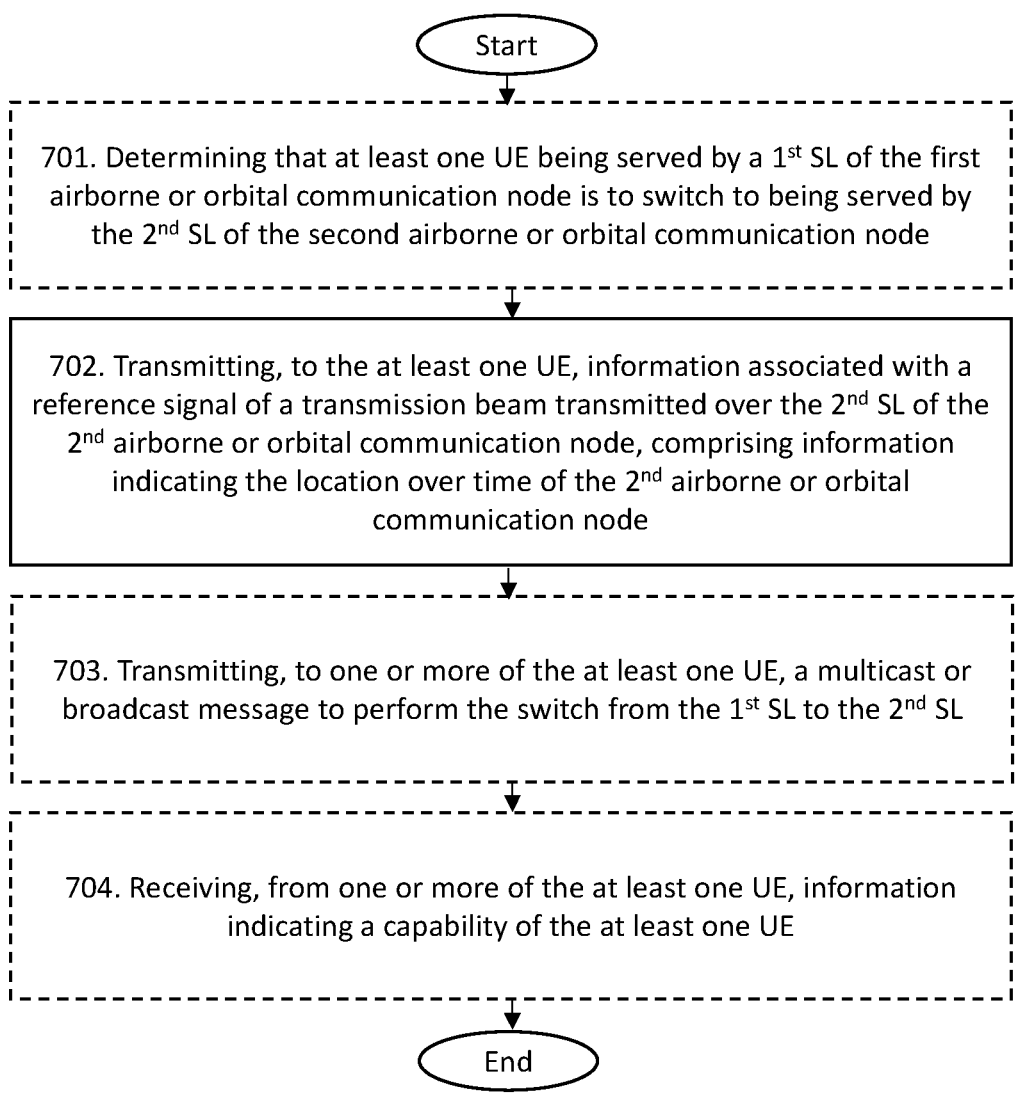
FIG. 7 is a flowchart depicting embodiments of methods in a first network entity.

Examples of embodiments of a method performed by a first network entity 110, 140 associated with a first airborne or orbital communication node 130 for enabling at least one wireless device 121 in a wireless communications network 100 to switch from being served by a first service link 122 of the first airborne or orbital communication node 130 to being served by a second service link 123 of a second airborne or orbital communication node 131, will now be described with reference to the flowchart depicted in FIG. 7. FIG. 7 is an illustrated example of actions or operations that may be taken by the first network entity 110, 140 in the wireless communication network 100 described and shown in FIG. 7. According to some embodiments, the first network entity 110, 140 is partly or fully comprised in the first airborne or orbital communication node 130 and/or partly or fully comprised located in an earth-based gateway 140 in the wireless communication network. In other words, these actions may be performed by the network node 110 in cooperation with both the gateway 140 and the first airborne or orbital communication node 130 depending on the current NTN configuration. The method may comprise the following actions.

Action 701. Optionally, the first network entity 110, 140 may determine that the at least one wireless device 121 being served by the first service link 122 of the first airborne or orbital communication node 130 is to switch to being served by the second service link 123 of the second airborne or orbital communication node 131. In other words, this means that the first network entity 110, 140 may be informed about, or make a decision, that the at least one wireless device 121 is to switch from the first service link 122 to the second service link 123 before transmitting the information in Action 702 to at least one wireless device 121. Optionally, this may also be used to trigger the transmission of the information in Action 702.

Action 702. The first network entity 110, 140 transmits, to the at least one wireless device 121, information associated with a reference signal of a transmission beam transmitted over the second service link 123 of the second airborne or orbital communication node 131, comprising information indicating the location over time of the second airborne or orbital communication node 131. Advantageously, this information enables the wireless device 121 to make an efficient switch from the first service link 122 to the second service link 123. This information may also be referred to as a location based transmission configuration indication. Also, the position or location over time of the second airborne or orbital communication node 131 may also be referred to herein as the location and movement of the second airborne or orbital communication node 131.

According to some embodiments, the information associated with a reference signal of a transmission beam transmitted over the second service link 123 of the second airborne or orbital communication node 131 is Transmission Configuration Indication, TCI, state information. In other words, the first network entity 110, 140 may transmit modified TCI-state related information to the at least one wireless device 121. In this case, according to some embodiments, the reference signal is a Quasi Co-Located, QCL, source reference signal, and the TCI state information comprise QCL information indicating the QCL source reference signal identity and the location over time of the second airborne or orbital communication node 131. In other words, this means that a TCI state may be complemented with the position and movement of the second airborne or orbital communication node 131 transmitting a QCL source reference signal, which is defined in the QCL-info field within the TCI-state information element.

Further, according to some embodiments, the information indicating the location over time of the second airborne or orbital communication node 131 is ephemeris information of the second airborne or orbital communication node 131, or an ephemeris identity indicating the ephemeris information of the second airborne or orbital communication node 131. Here, ephemeris information may refer to e.g. a description of the trajectory and/or flight path of the second airborne or orbital communication node. In other words, the ephemeris information may be said to describe the position or location over time of the second airborne or orbital communication node. For example, for an NTN, the position and movement of the second airborne or orbital communication node 131 may be given by the ephemeris of the second airborne or orbital communication node 131, e.g. satellite B, which may be comprised in the QCL source reference signal transmitted by the first network entity 110, 140. According to one example, the ephemeris of the second airborne or orbital communication node 131, e.g. satellite B ephemeris, may be indicated in the QCL-info by means of an ephemeris identity, ID. In this case, the ephemeris ID may, for example, be linked to an ephemeris of the second airborne or orbital communication node 131 signalled or transmitted separately by the first network entity 110, 140 to the wireless device 121.

According to one example, an existing QCL-info field may be updated to comprise an ephemeris ID indicating an ephemeris of the second airborne or orbital communication node 131 as follows:

```
QCL-Info ::=       SEQUENCE{
  cell             ServCellIndex OPTIONAL -- Need R ephemeris-Id                                       Ephemeris-Id bwp-Id           BWP-Id          OPTIONAL, -- Cond CSI-RS-Indicated
  referenceSignal  CHOICE {
    csi-rs         NZP-CSI-RS-ResourceId,
    ssb            SSB-Index
  },
  qcl-Type         ENUMERATED {typeA, typeB, typeC, typeD},
  ...
```

Here, the ephemeris ID is illustrated within the dashed frame.

According to some embodiments, the TCI state information may also be included in a message carrying an ephemeris of the second airborne or orbital communication node 131, e.g. satellite B ephemeris, as follows:

```
Ephemeris ::=              SEQUENCE { ephemeris-Id              EphemerisId,
[NOTE: Parameters not related to TCI is here omitted]

tci-StatesToAddModList      SEQUENCE (SIZE(1..maxNrofTCI-States)) OF

TCI-StateId, tci-StatesToReleaseList     SEQUENCE (SIZE(1..maxNrofTCI-States)) OF TCI- StateId,
   ...
}
```

In this case, the message carrying the ephemeris ID gives the identity of the first airborne or orbital communication node 130, i.e. a source transmitting node or transmitting node, such as, e.g. satellite A in FIG. 6. In the example above, the parameters not related to TCI (such as parameters for describing the position and movement of the first airborne or orbital communication node 130) are omitted. In this message, the first network entity 110, 140 additionally may add, modify, or remove TCI states associated with the first airborne or orbital communication node 130. However, upon a switch to a service link of the second airborne or orbital communication node 131, i.e. a target transmitting node or new transmitting node, such as, e.g. satellite B in FIG. 6, the first network entity 110, 140 may activate one or more TCI states which are part of the TCI state list associated with the second airborne or orbital communication node 131.

In regards to the TCI-state signalling, according to some embodiments, the QCL signalling related to an NTN service link switch may be broadcasted or multi-casted to all wireless devices or UEs in a cell by the first network entity 110, 140. The signalling may, for example, comprise: configuring a TCI state containing a source reference signal associated with a transmit beam provided from the second airborne or orbital communication node 131 providing coverage after a service link switch, and then activating the mentioned TCI state. In addition, according to some embodiments, a group-DCI addressed to all wireless devices or UEs in a spot beam may be used as trigger for reading a broadcasted message, e.g. a system information message, comprising one or both of the TCI state configuration and activation. Further, according to some embodiments, a group DCI addressed to wireless devices or UEs in a spot beam may be used as a direct command for TCI state activation. According to some embodiments, upon detecting beam failure, wireless devices or UEs may be triggered to read the broadcasted message comprising one or both of the TCI state configuration and activation.

Action 703. Optionally, the first network entity 110, 140 may transmit that the at least one wireless device 121 being served by the first service link 122 of the first airborne or orbital communication node 130 are to switch to being served by the second service link 123 of the second airborne or orbital communication node 131. According to some embodiments, this may be performed via a multicast or broadcast message to the at least one wireless device 121.

In regards to the TCI-state activation time, the first airborne or orbital communication node 130 and/or first network entity 110, 140 may, according to some embodiments, upon a switch of service link, activate one or more TCI states associated with the second airborne or orbital communication node 131. In the existing TCI state framework, a new TCI state becomes activated 3 ms after a wireless device sends an ACK for the received MAC CE command activating the TCI states. The 3 ms activation time is feasible for a wireless device with phased array implementation that may promptly switch the electronically steerable beam between the first airborne or orbital communication node 130 and the second airborne or orbital communication node 131, i.e. between source and target transmitting nodes. The 3 ms activation time may sometimes, however, be challenging for a wireless device with a mechanically steered antenna.

Action 704. The first network entity 110, 140 may further receive, from one or more of the at least one wireless device 121, information indicating the capability of the wireless device 121 for activating a TCI state according to the TCI state information within a time period. This means that, according to some embodiments, the first network entity 110, 140 may, via the first airborne or orbital communication node 130, receive the capability of TCI state activation/application timing of a wireless device 121.

It should also be noted that a switch between TCI states associated with the same transmitting node, i.e. an intra-TX TCI switch of the first airborne or orbital communication node 130, may be faster than a switch between TCI states associated with different transmitting nodes, i.e. an inter-TX TCI switch between the first airborne or orbital communication node 130 and the second airborne or orbital communication node 131. Hence, the first network entity 110, 140 may separately receive capability values for an intra- and inter-TX TCI switch from a wireless device 121.

Furthermore, in order to facilitate the switch from the first service link 122 to the second service link 123 and the finding of the second airborne or orbital communication node 131, e.g. a new satellite, such as, e.g. satellite B in FIG. 6, the first network entity 110, 140 should indicate the ephemeris of the second airborne or orbital communication node 131. However, it may also associate the new TCI state and spatial relations with the ephemeris of the second airborne or orbital communication node 131. In particular, for uplink transmissions, the first airborne or orbital communication node 130 may configure one or more spatial relations for PUCCH associated with the downlink reference signals mapped to the beam(s) provided by second airborne or orbital communication node 131. At the time of the service link switch, the first airborne or orbital communication node 130 may use MAC CE to activate a spatial relation suitable for transmitting PUCCH to satellite B. For codebook and non-codebook based PUSCH transmissions the spatial TX filter is indicated by the DCI Sounding Reference Signal, SRS Resource Indicator. This means that the SRS resource associated with the SRS Resource Indicator needs to be configured. It provides a spatial relation to a downlink reference signal mapped to the beam(s) provided by the second airborne or orbital communication node 131. For codebook based PUSCH, Rel-15 also requires that the SRS is actually transmitted at least once before the DCI containing the SRI is received. For non-codebook based PUSCH, the wireless device 121 may alternatively determine the spatial TX filter based on reception of a NZP CSI-RS configured to be associated with the SRS. Semi-persistent SRS or aperiodic SRS can be considered to be used by the second airborne or orbital communication node 131 to initiate the service link switch. Semi-persistent SRS supports MAC CE activation and reconfiguration of the spatial relation. Aperiodic SRS is triggered by DCI, but needs to be RRC configured with the correct spatial relation.

Figure 8:
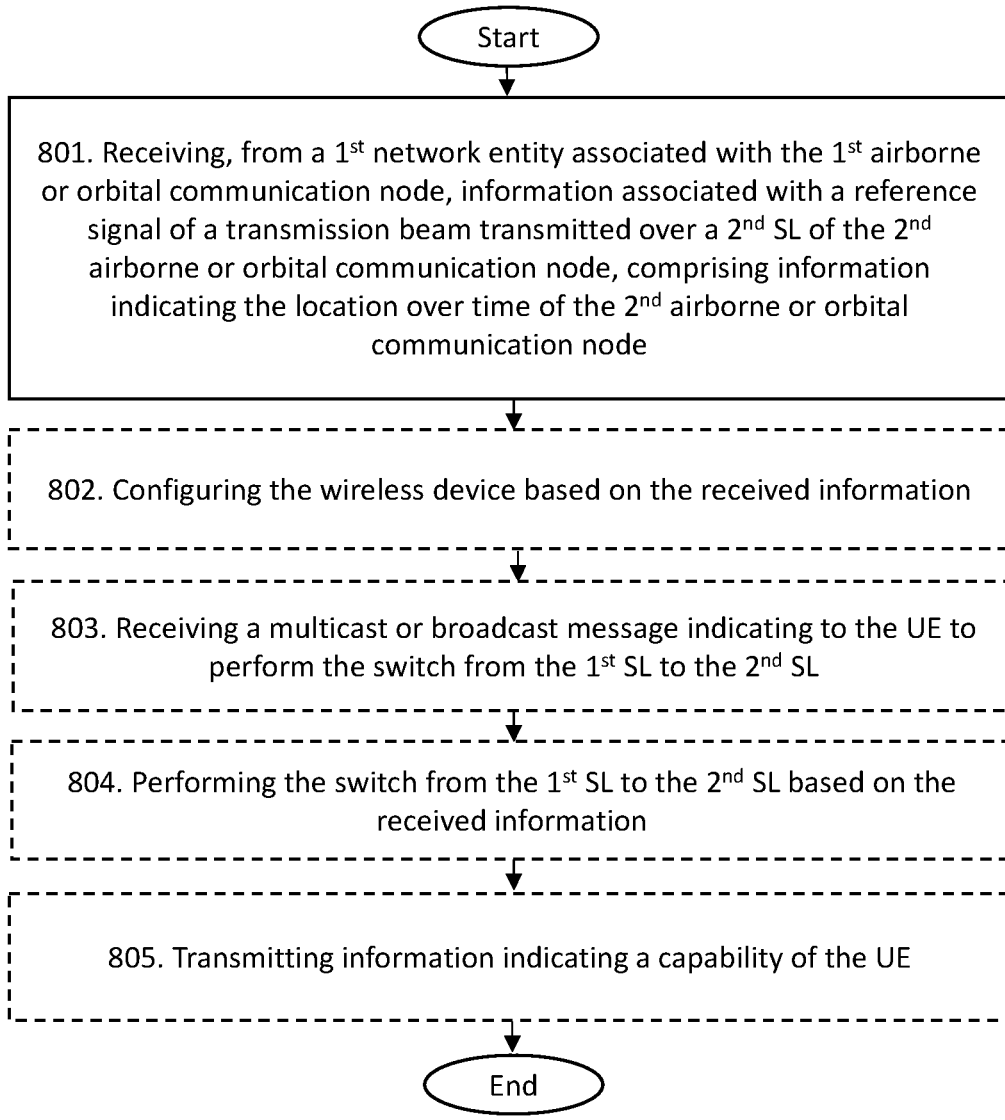
FIG. 8 is a flowchart depicting embodiments of methods in a wireless device.

Examples of embodiments of a method performed by a wireless device 121 for enabling a switch from being served by a first service link 122 of a first airborne or orbital communication node 130 to being served by a second service link 123 of a second airborne or orbital communication node 131 in a wireless communications network 100, will now be described with reference to the flowchart depicted in FIG. 8. FIG. 8 is an illustrated example of actions or operations which may be taken by the wireless device 121 in the wireless communication network 100 described and shown in FIGS. 1-6. The method may comprise the following actions.

Action 801. The wireless device 121 receives, from a first network entity 110, 140 associated with the first airborne or orbital communication node 130, information associated with a reference signal of a transmission beam transmitted over the second service link 123 of the second airborne or orbital communication node 131, comprising information indicating the location over time of the second airborne or orbital communication node 131. Advantageously, this information enables the wireless device 121 to make an efficient switch from the first service link 122 to the second service link 123. This information may also be referred to as a location based transmission configuration indication.

According to some embodiments, the information associated with a reference signal of a transmission beam transmitted over the second service link 123 of the second airborne or orbital communication node 131 is Transmission Configuration Indication, TCI, state information. In other words, the wireless device 121 may receive modified TCI-state related information from the first network entity 110, 140. In this case, according to some embodiments, the reference signal is a Quasi Co-Located, QCL, source reference signal, and the TCI state information comprise QCL information indicating the QCL source reference signal identity and the location over time of the second airborne or orbital communication node 131. In other words, this means that a TCI state may be complemented with the position and movement of the second airborne or orbital communication node 131 transmitting a QCL source reference signal, which is defined in the QCL-info field within the TCI-state information element.

Further, according to some embodiments, the information indicating the location over time of the second airborne or orbital communication node 131 is ephemeris information of the second airborne or orbital communication node 131, or an ephemeris identity indicating the ephemeris information of the second airborne or orbital communication node 131. For example, for an NTN, the position and movement of the second airborne or orbital communication node 131 may be given by the ephemeris of the second airborne or orbital communication node 131, e.g. satellite B, which may be comprised in the QCL source reference signal received by the wireless device 121. According to one example, the ephemeris of the second airborne or orbital communication node 131, e.g. satellite B ephemeris, may be indicated in the QCL-info by means of an ephemeris identity, ID. In this case, the ephemeris ID may, for example, be linked to an ephemeris of the second airborne or orbital communication node 131 signalled or transmitted separately to the wireless device 121 by the first network entity 110, 140.

According to one example, an existing QCL-info field may be updated to comprise an ephemeris ID indicating an ephemeris of the second airborne or orbital communication node 131 as follows:

```
QCL-Info ::=        SEQUENCE{
    cell            ServCellIndex OPTIONAL -- Need R
    ephemeris-Id                                           Ephemeris-Id
    bwp-Id              BWP-Id OPTIONAL, -- Cond CSI-RS-Indicated
    referenceSignal     CHOICE {
        csi-rs          NZP-CSI-RS-ResourceId,
        ssb             SSB-Index
    },
    qcl-Type            ENUMERATED {typeA, typeB, typeC, typeD},
    ...
```

Here, the ephemeris ID is illustrated within the dashed frame.

According to some embodiments, the TCI state information may also be included in a message carrying an ephemeris of the second airborne or orbital communication node 131, e.g. satellite B ephemeris, as follows:

```
Ephemeris ::=           SEQUENCE
    ephemeris-Id        EphemerisId,
[NOTE: Parameters not related to TCI is here omitted]
```

```
tci-StatesToAddModList      SEQUENCE (SIZE(1..maxNrofTCI-States)) OF
TCI-StateId,
    tci-StatesToReleaseList     SEQUENCE (SIZE(1..maxNrofTCI-States)) OF TCI-
StateId,
    ...
}
```

In this case, the message carrying the ephemeris ID gives the identity of the first airborne or orbital communication node 130, i.e. a source transmitting node or transmitting node, such as, e.g. satellite A in FIG. 6. In the example above, the parameters not related to TCI (such as parameters for describing the position and movement of the first airborne or orbital communication node 130) are omitted. In this message, the first network entity 110, 140 additionally may add, modify, or remove TCI states associated with the first airborne or orbital communication node 130. However, upon a switch to a service link of the second airborne or orbital communication node 131, i.e. a target transmitting node or new transmitting node, such as, e.g. satellite B in FIG. 6, the first network entity 110, 140 may activate one or more TCI states which are part of the TCI state list associated with the second airborne or orbital communication node 131.

In regards to the TCI-state signalling, according to some embodiments, the QCL signalling related to an NTN service link switch may be received in a broadcasted or multi-casted in the wireless device 121 from the first network entity 110, 140. Also, according to some embodiments, a group-DCI addressed to the wireless device 121 in a spot beam may be used as trigger for the wireless device 121 to read a broadcasted message, e.g. a system information message, comprising one or both of a TCI state configuration and activation from the first network entity 110, 140. Further, according to some embodiments, a group DCI addressed to wireless devices or UEs in a spot beam may be used as a direct command for TCI state activation. According to some embodiments, upon detecting beam failure, the wireless device 121 may be triggered to read the broadcasted message comprising one or both of the TCI state configuration and activation.

Action 802. After the reception in Action 801, the wireless device 121 may configure the wireless device 121 based on the received information. This means that the wireless device 121 may be configured to perform an efficient switch from the first service link 122 to the second service link 123. Here, configuring may include incorporating the received information in the wireless device 121 or UE, e.g. adding new or $2^{nd}$ TCI state(s) to the TCI states of the wireless device 121. For example, TCI states may already exist for the reference signal of a transmission beam transmitted over the first service link 122 of the first airborne or orbital communication node 130.

Action 803. The wireless device 121 may also receive a multicast or broadcast message indicating to the wireless device 121 to perform the switch from the first service link 122 to the second service link 123. This means that the first network entity 110, 140 may inform the wireless device 121 that it should perform the switch from the first service link 122 to the second service link 123.

Action 804. After the reception in Action 803, the wireless device 121 may perform the switch from the first service link 122 to the second service link 123 based on the received information associated with a reference signal of a transmission beam transmitted over the second service link 123 of the second airborne or orbital communication node 131, comprising information indicating the location over time of the second airborne or orbital communication node 131. This means that the wireless device 121 may execute the switch from the first service link 122 to the second service link 123 as instructed, e.g. by the first network entity 110, 140. Here, the ephemeris identity/information/data may be used to direct its receive beam for receiving the QCL source reference signal and/or other signals quasi co-located, QCL: d, with the QCL source reference signal.

According to some embodiments, the wireless device 121 may perform the switch from the first service link 122 to the second service link 123 by activating one or more TCI states according to the TCI state information in order to receive the reference signal of the transmission beam transmitted over the second service link 123 of the second airborne or orbital communication node 131. In regards to the TCI-state activation time, the first airborne or orbital communication node 130 and/or first network entity 110, 140 may, according to some embodiments, upon a switch of service link, activate one or more TCI states associated with the second airborne or orbital communication node 131. In the existing TCI state framework, a new TCI state becomes activated 3 ms after the wireless device 121 sends an ACK for the received MAC CE command activating the TCI states. Here, it should be noted that the 3 ms activation time may be feasible for a wireless device 121 in case the wireless device 12, for example, is equipped with a phased array implementation that may promptly switch the electronically steerable beam between the first airborne or orbital communication node 130 and the second airborne or orbital communication node 131, i.e. between source and target transmitting nodes.

Action 805. Optionally, the wireless device 121 may transmit information indicating the capability of the wireless device 121 for activating a TCI state according to the TCI state information within a time period. This means that, according to some embodiments, the wireless device 121 may reports its capability of TCI state activation/application timing to the first network entity 110, 140 via the first airborne or orbital communication node 130.

It should also be noted that a switch between TCI states associated with the same transmitting node, i.e. a intra-TX TCI switch of the first airborne or orbital communication node 130, may be faster than a switch between TCI states associated with different transmitting nodes, i.e. an inter-TX TCI switch between the first airborne or orbital communication node 130 and the second airborne or orbital communication node 131. Hence, the wireless device 121 may separately report capability values for an intra- and inter-TX TCI switch.

Figure 9:
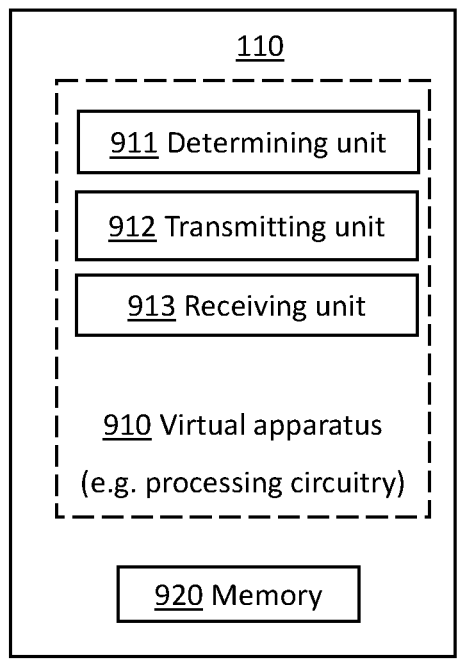
FIG. 9 is a block diagram depicting embodiments of a first network entity.

To perform the method actions in a first network entity 110, 140 associated with a first airborne or orbital communication node 130 for enabling at least one wireless device 121 in a wireless communications network 100 to switch from being served by a first service link 122 of the first airborne or orbital communication node 130 to being served by a second service link 123 of a second airborne or orbital communication node 131, the first network entity 110, 140 may comprise the following arrangement depicted in FIG. 9. FIG. 9 shows a schematic block diagram of embodiments of a virtual apparatus 910 that may be implemented in the first network entity 110, 140.

FIG. 9 illustrates a schematic block diagram of embodiments of an apparatus 910 in a wireless communications network 100 (for example, the wireless network shown in any one of the FIGS. 1-6 and 11). The apparatus 910 may be implemented in a base station or network node 110 (e.g. the network node QQ160 shown in FIG. 11). Apparatus 910 is operable to carry out the example method described with reference to FIG. 7, and possibly any other processes or methods disclosed herein. It is also to be understood that the method of FIG. 7 is not necessarily carried out solely by apparatus 910. At least some operations of the method may be performed by one or more other entities.

Apparatus 910, also referred to as a virtual apparatus implemented in a base station, may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a determining unit 911, a transmitting unit 912, and a receiving unit 913, and any other suitable units of apparatus 910 to perform corresponding functions according one or more embodiments of the present disclosure.

The first network entity 110, 140 or processing circuitry therein is configured to, or may comprise the transmitting unit 912 configured to, transmit, to the at least one wireless device 121, information associated with a reference signal of a transmission beam transmitted over the second service link 123 of the second airborne or orbital communication node 131, comprising information indicating the location over time of the second airborne or orbital communication node 131.

Also, the first network entity 110, 140 or processing circuitry therein may be configured to, or may comprise the determining unit 911 configured to, determine that the at least one wireless device 121 being served by the first service link 122 of the first airborne or orbital communication node 130 are to switch to being served by the second service link 123 of the second airborne or orbital communication node 131.

According to some embodiments, the information associated with a reference signal of a transmission beam transmitted over the second service link 123 of the second airborne or orbital communication node 131 is Transmission Configuration Indication, TCI, state information. In this case, according to some embodiments, the reference signal is a Quasi Co-Located, QCL, source reference signal, and the TCI state information comprise QCL information indicating the QCL source reference signal identity and the location over time of the second airborne or orbital communication node 131. According to some embodiments, the information indicating the location over time of the second airborne or orbital communication node 131 is ephemeris information of the second airborne or orbital communication node 131, or an ephemeris identity indicating the ephemeris information of the second airborne or orbital communication node 131.

Further, according to some embodiments, the first network entity 110, 140 or processing circuitry therein may be configured to, or may comprise the transmitting unit 912 configured to, transmit that the at least one wireless device 121 being served by the first service link 122 of the first airborne or orbital communication node 130 are to switch to being served by the second service link 123 of the second airborne or orbital communication node 131. Furthermore, according to some embodiments, the first network entity 110, 140 or processing circuitry therein may be configured to, or may comprise the receiving unit 913 configured to, receive, from one or more of the at least one wireless device 121, information indicating the capability of the wireless device 121 for activating a TCI state according to the TCI state information within a time period.

According to some embodiments, the first network entity 110, 140 may be partly or fully comprised in the first airborne or orbital communication node 130 and/or partly or fully comprised located in an earth-based gateway 140 in the wireless communication network 100. In addition, according to some embodiments, the first network entity 110, 140 may comprise a power supply circuitry configured to supply power to the first network entity 110, 140.

Figure 10:
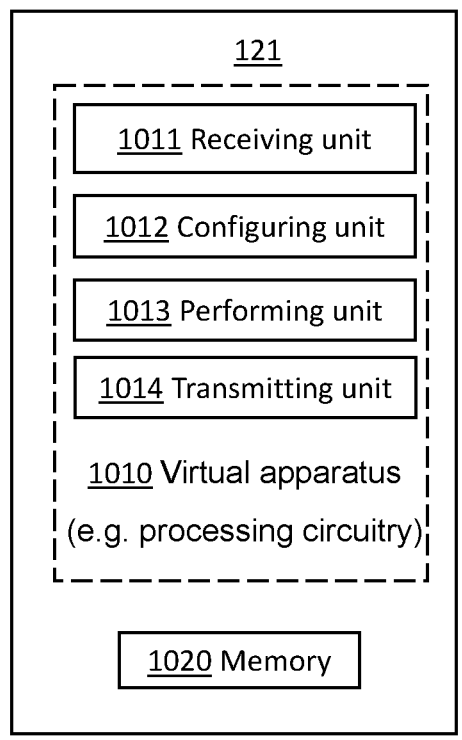
FIG. 10 is a block diagram depicting embodiments of a wireless device.

To perform the method actions in a wireless device 121 for enabling a switch from being served by a first service link 122 of a first airborne or orbital communication node 130 to being served by a second service link 123 of a second airborne or orbital communication node 131 in a wireless communications network 100, the wireless device 121 may comprise the following arrangement depicted in FIG. 10. FIG. 10 shows a schematic block diagram of embodiments of a virtual apparatus 810 that may be implemented in the wireless device 121.

FIG. 10 illustrates a schematic block diagram of embodiments of an apparatus 1010 in a wireless communications network 100 (for example, the wireless network shown in any one of the FIGS. 1-6 and 11). The apparatus 1010 may be implemented in a wireless device 121 (e.g. the wireless device QQ110 shown in FIG. 11). Apparatus 1010 is operable to carry out the example method described with reference to FIG. 8, and possibly any other processes or methods disclosed herein. It is also to be understood that the method of FIG. 8 is not necessarily carried out solely by apparatus 1010. At least some operations of the method may be performed by one or more other entities.

Apparatus 1010, also referred to as a virtual apparatus implemented in a base station, may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a receiving unit 1011, a configuring unit 1012, a performing unit 1013, and a receiving unit 1014, and any other suitable units of apparatus 1010 to perform corresponding functions according one or more embodiments of the present disclosure.

The wireless device 121 or processing circuitry therein is configured to, or may comprise the receiving unit 1011 configured to, receive, from a first network entity 110, 140 associated with the first airborne or orbital communication node 130, information associated with a reference signal of a transmission beam transmitted over the second service link 123 of the second airborne or orbital communication node 131, comprising information indicating the location over time of the second airborne or orbital communication node 131. In addition, the wireless device 121 or processing circuitry therein may be configured to, or may comprise the configuring unit 1012 configured to, configure the wireless device 121 based on the received information.

According to some embodiments, the information associated with a reference signal of a transmission beam transmitted over the second service link 123 of the second airborne or orbital communication node 131 is Transmission Configuration Indication, TCI, state information. In this case, according to some embodiments, the reference signal is a Quasi Co-Located, QCL, source reference signal, and the TCI state information comprise QCL information indicating the QCL source reference signal identity and the location over time of the second airborne or orbital communication node 131. According to some embodiments, the information indicating the location over time of the second airborne or orbital communication node 131 is ephemeris information of the second airborne or orbital communication node 131, or an ephemeris identity indicating the ephemeris information of the second airborne or orbital communication node 131.

Further, according to some embodiments, the first network entity 110, 140 or processing circuitry therein may be configured to, or may comprise the receiving unit 1011 configured to, receive a multicast or broadcast message indicating to the wireless device 121 to perform the switch from the first service link 122 to the second service link 123. In this case, according to some embodiments, the first network entity 110, 140 or processing circuitry therein may be configured to, or may comprise the performing unit 1013 configured to, perform the switch from the first service link 122 to the second service link 123 based on the received information associated with a reference signal of a transmission beam transmitted over the second service link 123 of the second airborne or orbital communication node 131, comprising information indicating the location over time of the second airborne or orbital communication node 131. According to some embodiments, the first network entity 110, 140 or processing circuitry therein may be configured to, or may comprise the performing unit 1013 configured to, perform the switch from the first service link 122 to the second service link 123 by activating one or more TCI states according to the TCI state information in order to receive the reference signal of the transmission beam transmitted over the second service link 123 of the second airborne or orbital communication node 131. Also, according to some embodiments, the wireless device 121 or processing circuitry therein is configured to, or may comprise the transmitting unit 1014 configured to, transmit information indicating the capability of the wireless device 121 for activating a TCI state according to the TCI state information within a time period. Further, in some embodiments, the wireless device 121 may comprise a power supply circuitry configured to supply power to the wireless device 121.

The description of the example embodiments provided herein has been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware. The term unit may also have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 11:
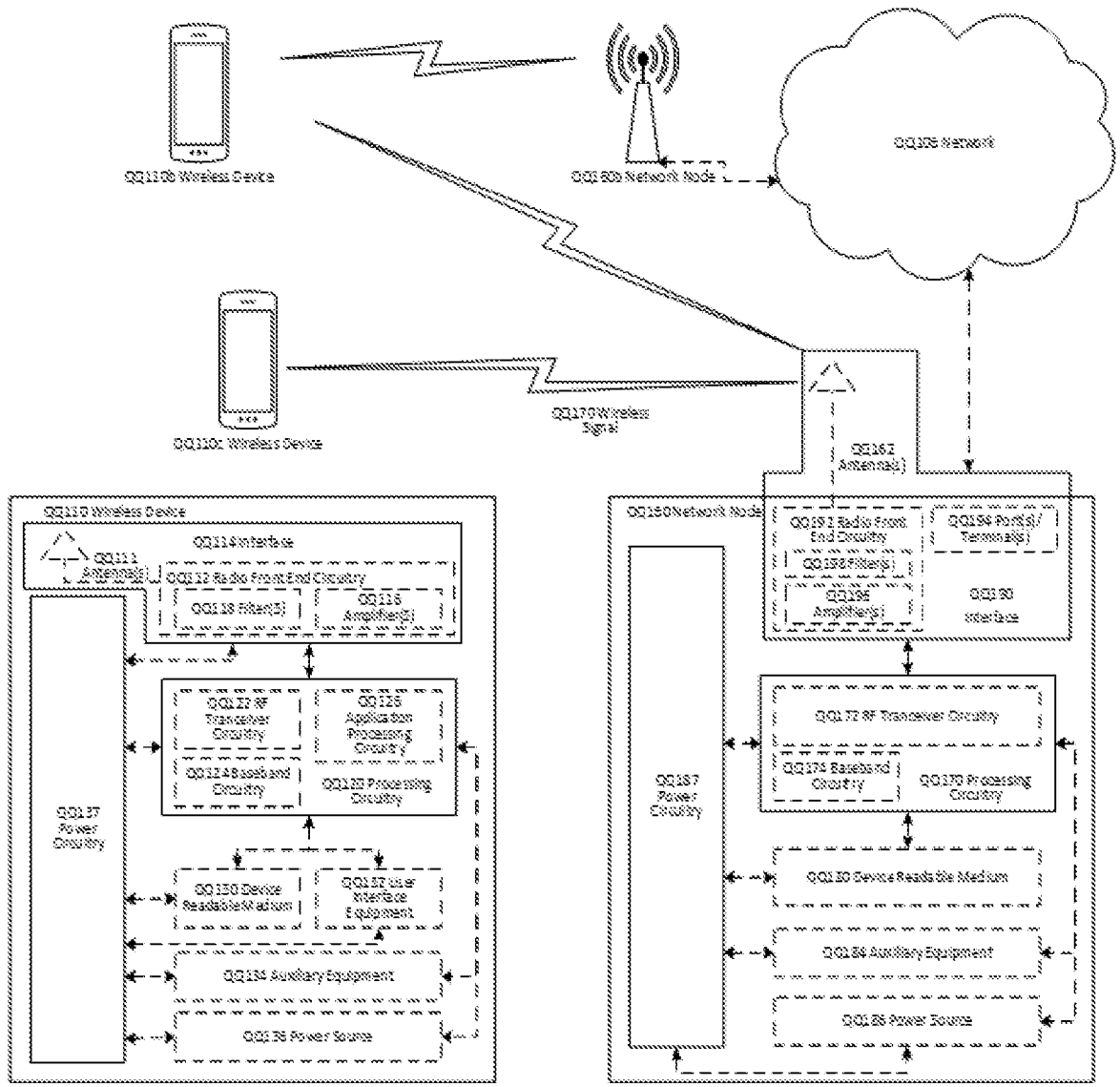
FIG. 11 is a schematic illustration of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
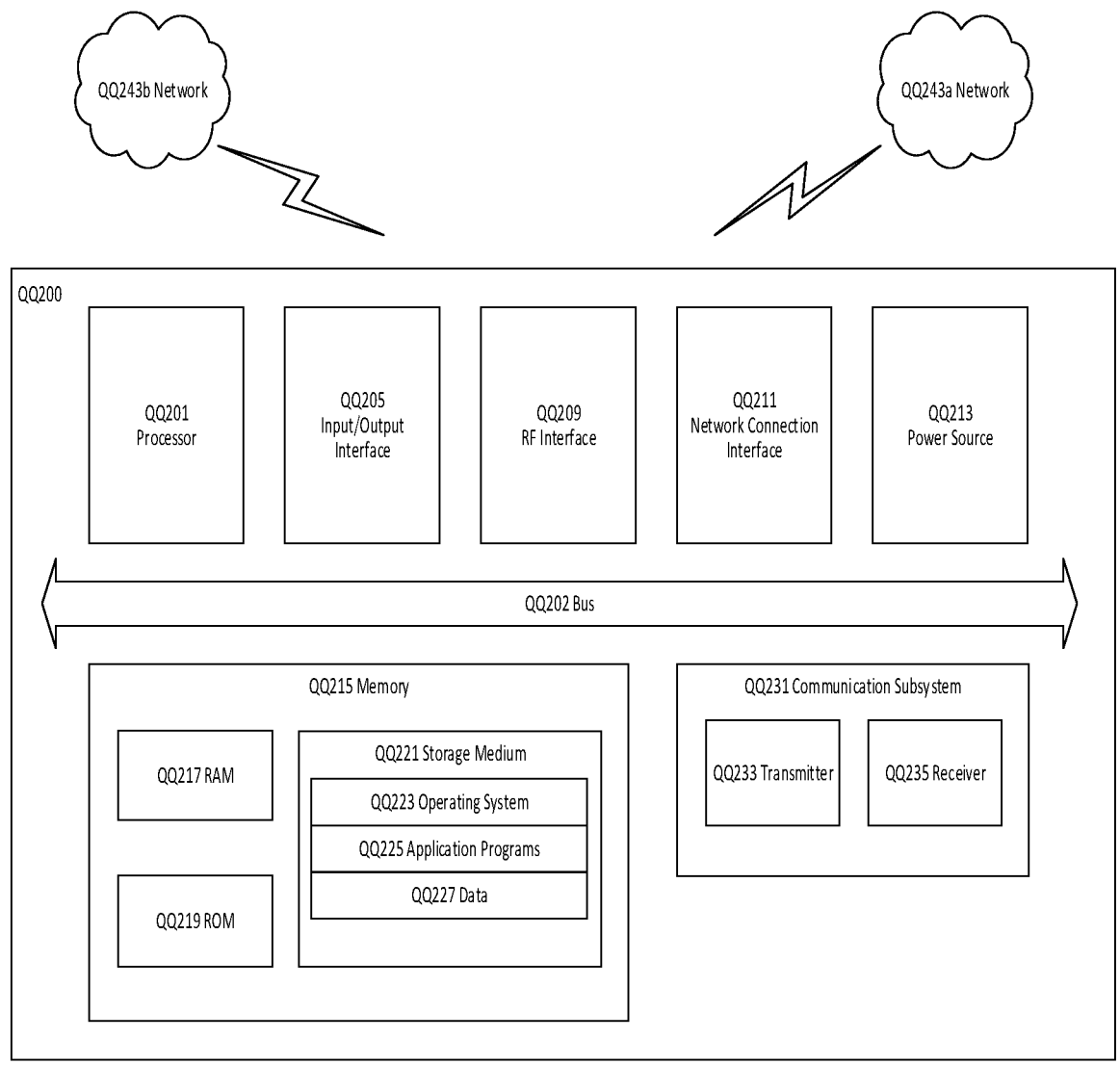
FIG. 12 is a schematic illustration of a user equipment.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately. RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200. The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein.

Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
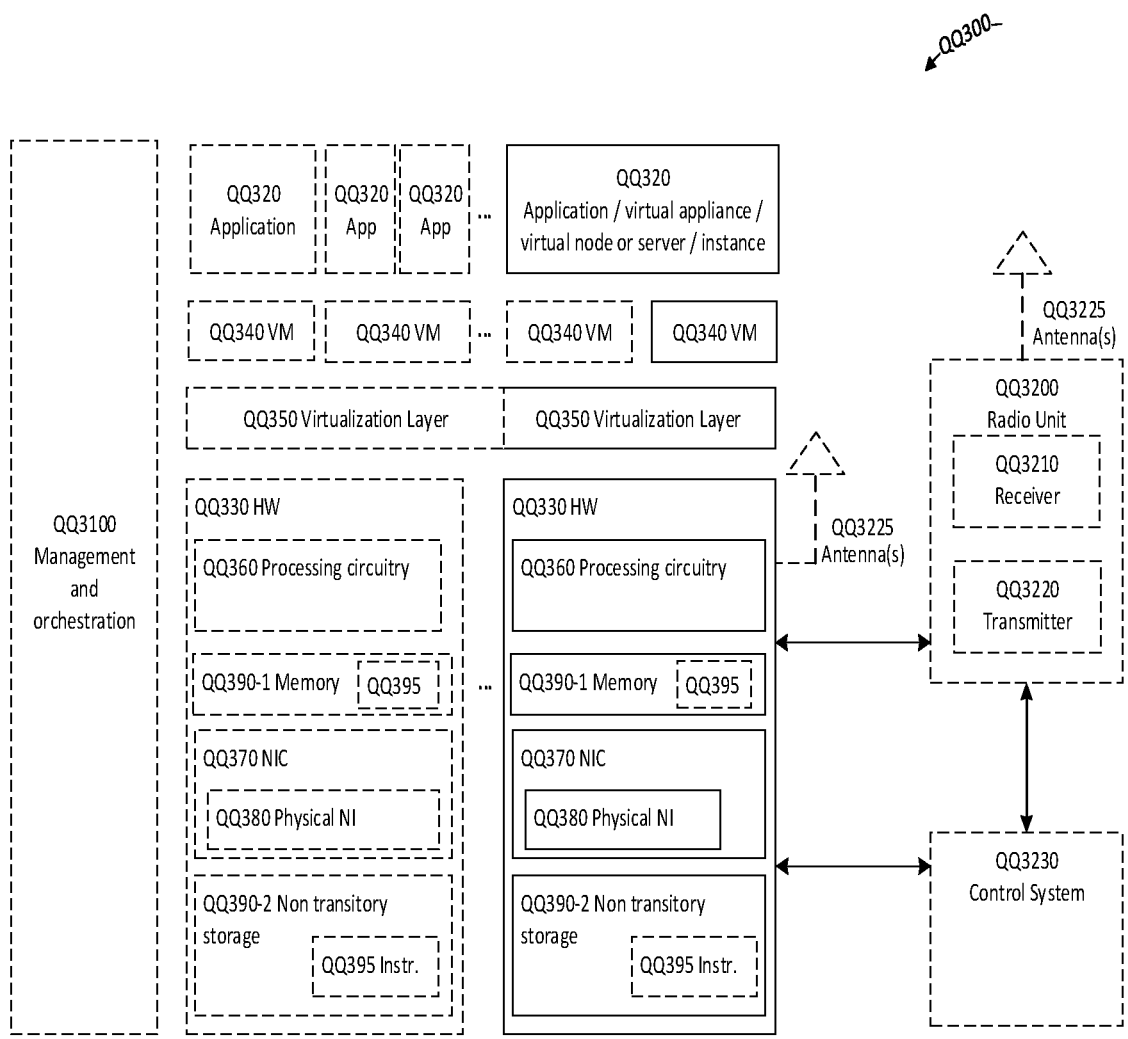
FIG. 13 is a schematic illustration of a virtualization environment in accordance with some embodiments, FIG. 14 schematically illustrates a telecommunication network connected via an intermediate network to a host computer.

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13. In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station. In some embodiments, some signalling can be effected with the use of control system QQ3230 which may alternatively be used for communication between the hardware nodes QQ330 and radio units QQ3200.

Figure 14:
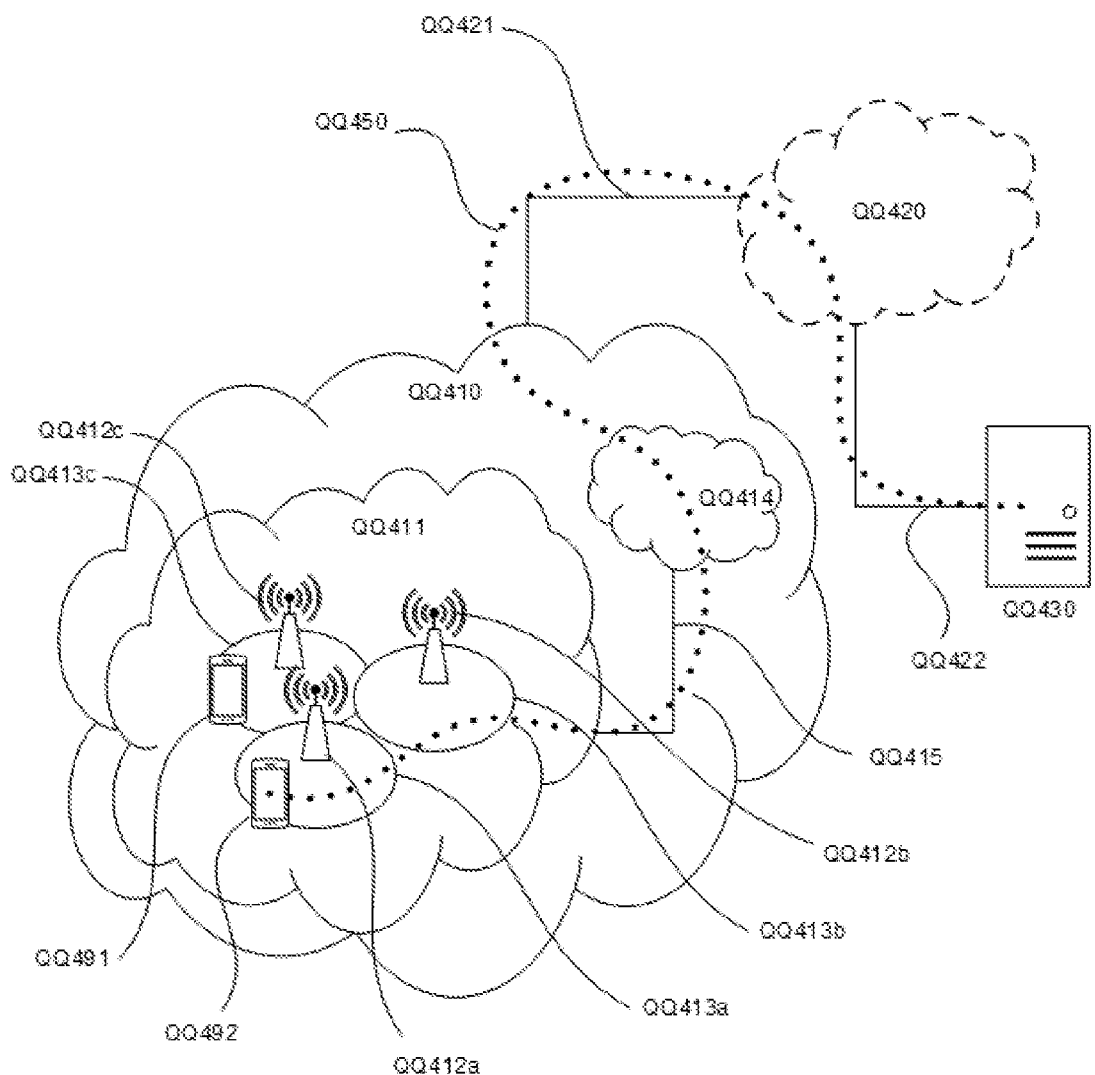

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides. It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

Figure 15:
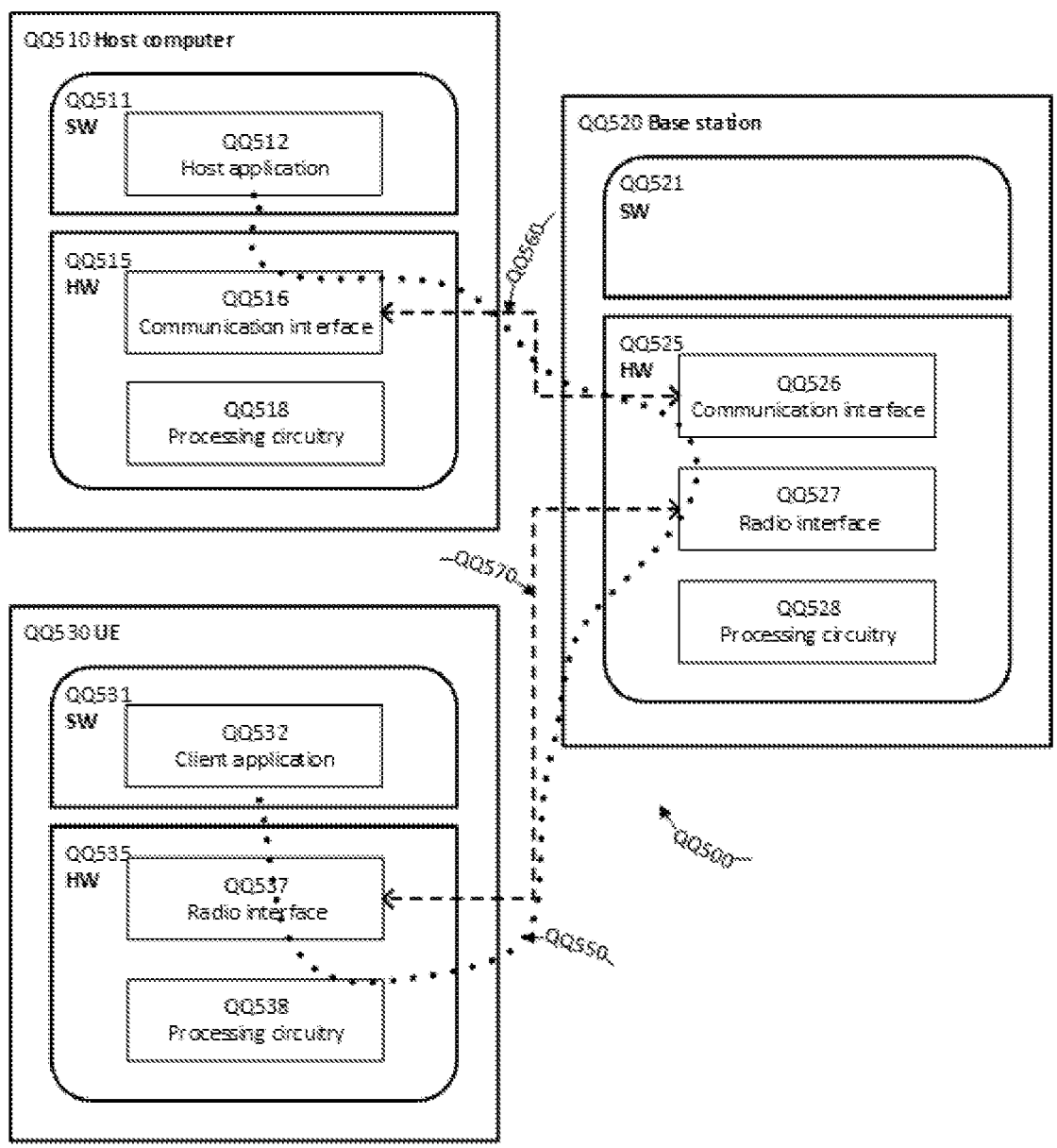
FIG. 15 is a generalized block diagram of a host computer communicating via a base station with a user equipment over a partially wireless connection.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency and thereby provide benefits such as reduced user waiting time and/or better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 16, 17:
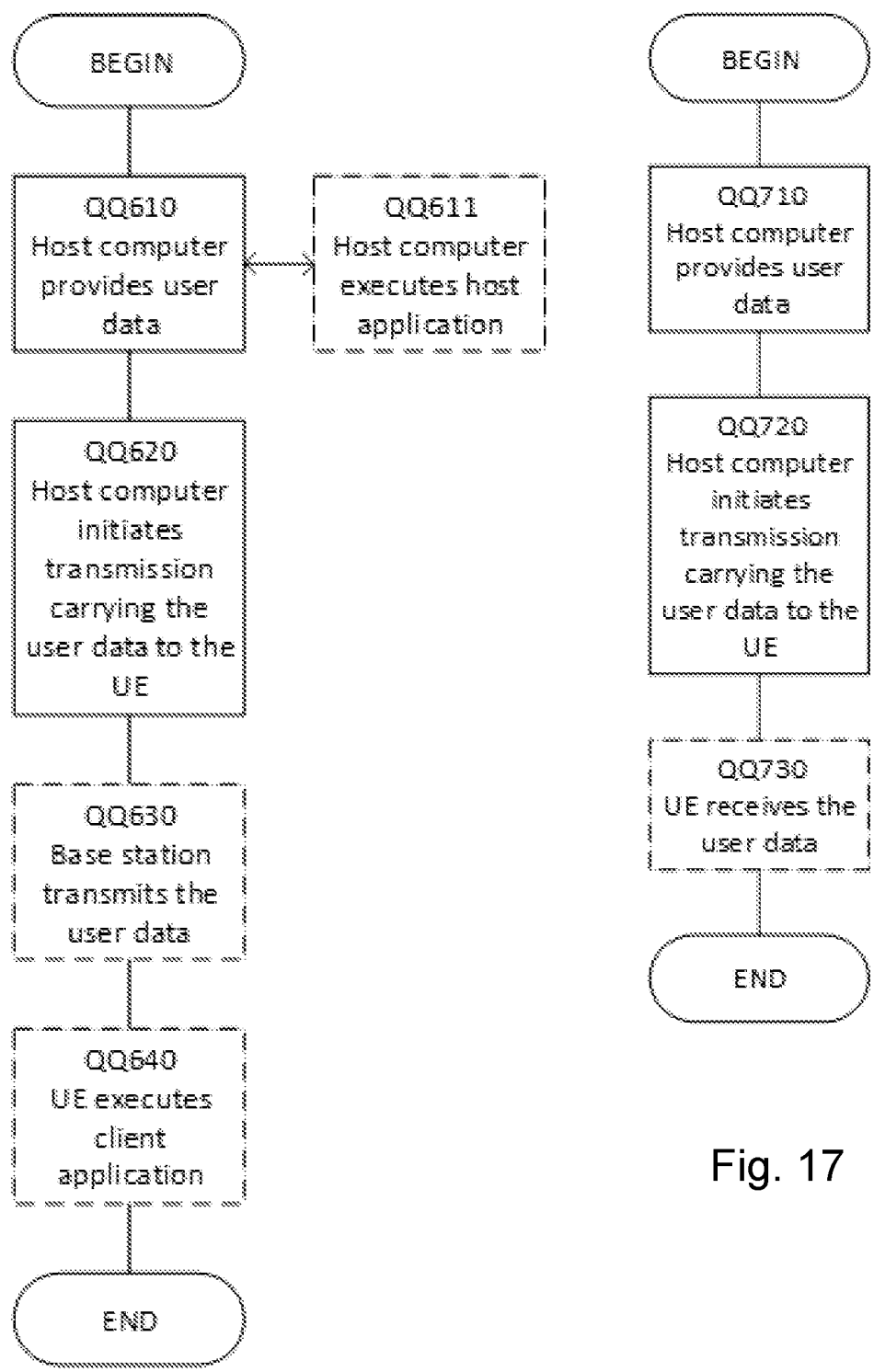
FIGS. 16-19 are flowcharts illustrating methods implemented in a communication system including a host computer, a base station and a user equipment.

FIG. 16 is a flowchart illustrating a method implemented in a communication system, in accordance with one embodiment. The communication system includes a host computer, a base station and a UE which may be those described with reference to FIGS. 14 and 11. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 11. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 18, 19:
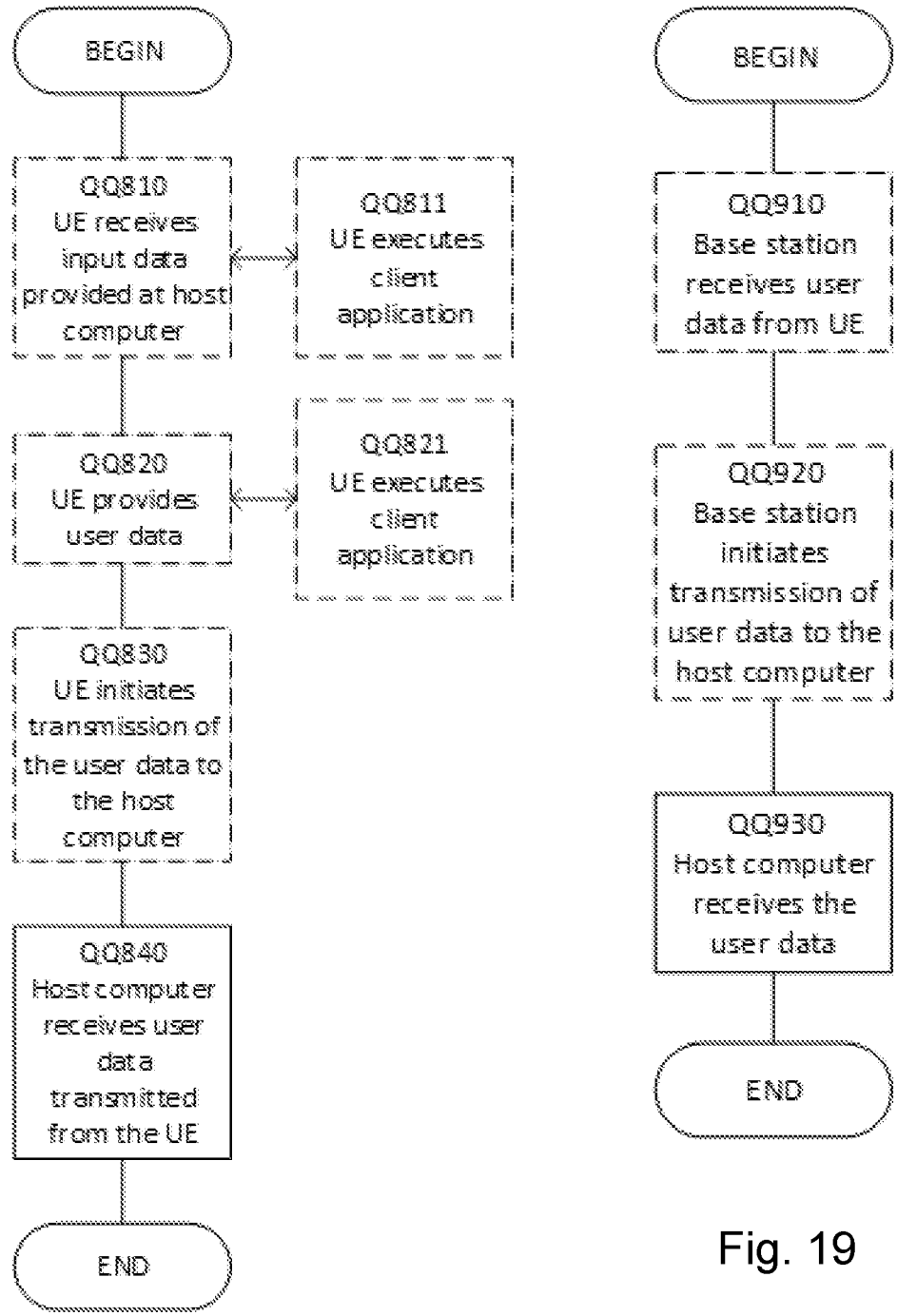

FIG. 18 is a flowchart illustrating a method implemented in a communication system, in accordance with one embodiment. The communication system includes a host computer, a base station and a UE which may be those described with reference to FIGS. 14 and 11. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 11. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Further Aspects of Some Embodiments

According to some embodiments, a wireless device for enabling a switch from being served by a first service link of an first airborne or orbital communication node to being served by a second service link of a second airborne or orbital communication node in a wireless communications network is provided. Here, the wireless device comprises: processing circuitry configured to perform any of the steps of any of the method described in FIG. 8; and power supply circuitry configured to supply power to the wireless device.

According to some embodiments, a first network entity associated with a first airborne or orbital communication node for enabling at least one wireless device in a wireless communications network to switch from being served by a first service link of the first airborne or orbital communication node to being served by a second service link of a second airborne or orbital communication node is provided. Here, the first network entity comprises: processing circuitry configured to perform any of the steps of any of the method described in FIG. 7; and power supply circuitry configured to supply power to the first network entity.

According to some embodiments, a user equipment (UE) for determining an identity of the wireless device, MsgB RNTI, in a wireless communications network during a random access procedure is provided. The UE may comprise: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the method described in FIG. 8; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

According to some embodiments, a communication system including a host computer is provided. The communication system comprises: processing circuitry configured to provide user data; and a communication interface configured to forward the user data to a cellular network for transmission to at least one user equipment (UE), wherein the cellular network comprises a first network entity having a radio interface and processing circuitry, the first network entity's processing circuitry configured to perform any of the steps of the methods described with reference to FIG. 7. This communication system may further include the first network entity. Also, the communication system may further including at least one UE, wherein the at least one UE is configured to communicate with the first network entity. Further, in the communication system, the processing circuitry of the host computer may be configured to execute a host application, thereby providing the user data; and the at least one UE may comprise processing circuitry configured to execute a client application associated with the host application.

According to another embodiment, a method implemented in a communication system including a host computer, a first network entity and a user equipment (UE) is provided. The method may comprise: at the host computer, providing user data; and at the host computer, initiating a transmission carrying the user data to the UE via a cellular network comprising the first network entity, wherein the first network entity performs any of the steps of the methods described with reference to FIG. 7 above. The method may comprise, at the first network entity, transmitting the user data. Further, in the method, the user data may be provided at the host computer by executing a host application. Additionally, the method may further comprise, at the UE, executing a client application associated with the host application. According to a further embodiment, a user equipment (UE) configured to communicate with a first network entity is provided. The UE may comprise a radio interface and processing circuitry configured to perform the method as described with reference to FIG. 8.

According to yet a further embodiment, a communication system including a host computer is provided. The communication system comprise processing circuitry configured to provide user data, and a communication interface configured to forward user data to a cellular network for transmission to a user equipment (UE), wherein the UE comprises a radio interface and processing circuitry, the UE's components configured to perform any of the steps of any of the methods described with reference to FIG. 8. In the communication system, the cellular network may further include a first network entity configured to communicate with the UE. In some embodiments, the processing circuitry of the host computer may be configured to execute a host application, thereby providing the user data; and the UE's processing circuitry may be configured to execute a client application associated with the host application.

According to yet another embodiment, a method implemented in a communication system including a host computer, a first network entity and a user equipment (UE) is provided. The method may comprise: at the host computer, providing user data; and at the host computer, initiating a transmission carrying the user data to the UE via a cellular network comprising the first network entity, wherein the UE performs any of the steps of the methods described with reference to FIG. 8 above. The method may comprise, at the UE, receiving the user data from the first network entity.

According to yet another embodiment, a communication system including a host computer is provided. The communication system comprises a communication interface configured to receive user data originating from a transmission from a user equipment (UE) to a first network entity, wherein the UE comprises a radio interface and processing circuitry, the UE's processing circuitry configured to perform any of the steps of the methods described with reference to FIG. 8 above. The communication system may also include the UE. Also, the communication system may include the first network entity, wherein the first network entity comprises a radio interface configured to communicate with the UE and a communication interface configured to forward to the host computer the user data carried by a transmission from the UE to the first network entity. In some embodiments, the processing circuitry of the host computer may be configured to execute a host application; and the UE's processing circuitry may be configured to execute a client application associated with the host application, thereby providing the user data. In some embodiments, the processing circuitry of the host computer is configured to execute a host application, thereby providing request data; and the UE's processing circuitry is configured to execute a client application associated with the host application, thereby providing the user data in response to the request data.

According to yet another embodiment, a method implemented in a communication system including a host computer, a first network entity and a user equipment (UE) is provided. The method may comprise: at the host computer, receiving user data transmitted to the first network entity from the UE, wherein the UE performs any of the steps of the methods described with reference to FIG. 8 above. In some embodiments, the method may comprise, at the UE, providing the user data to the first network entity. In some embodiments, the method may comprise, at the UE, executing a client application, thereby providing the user data to be transmitted; and, at the host computer, executing a host application associated with the client application. In some embodiments, the method may comprise, at the UE, executing a client application; and at the UE, receiving input data to the client application, the input data being provided at the host computer by executing a host application associated with the client application, wherein the user data to be transmitted is provided by the client application in response to the input data.

According to yet another embodiment, a communication system including a host computer comprising a communication interface configured to receive user data originating from a transmission from a user equipment (UE) to a first network entity is provided, wherein the first network entity comprises a radio interface and processing circuitry, the first network entity's processing circuitry configured to perform any of the steps of the methods described with reference to FIG. 7 above. In some embodiments, the communications system further includes the first network entity. In some embodiments, the communications system further includes the UE, wherein the UE is configured to communicate with the first network entity. In some embodiments, the processing circuitry of the host computer is configured to execute a host application; and the UE is configured to execute a client application associated with the host application, thereby providing the user data to be received by the host computer.

According to yet another embodiment, a method implemented in a communication system including a host computer, a first network entity and a user equipment (UE) is provided. The method may comprise: at the host computer, receiving, from the first network entity, user data originating from a transmission which the first network entity has received from the UE, wherein the UE performs any of the steps of the methods described with reference to FIG. 8 above. In some embodiments, the method may comprise at the first network entity, receiving the user data from the UE. some embodiments, the method may comprise at the first network entity, initiating a transmission of the received user data to the host computer. The embodiments herein are not limited to the above described preferred embodiments. Various alternatives, modifications and equivalents may be used. Therefore, the above embodiments should not be construed as limiting.

Abbreviations

3GPP 3rd Generation Partnership Project
5G 5th Generation
CDMA Code Division Multiplexing Access
CSI Channel State Information
DL Downlink
DMRS Demodulation Reference Signal
eNB E-UTRAN NodeB
E-UTRAN Evolved UTRAN
gNB Base station in NR
GSM Global System for Mobile communication
LTE Long-Term Evolution
MAC Medium Access Control
MME Mobility Management Entity
MSC Mobile Switching Center
NR New Radio
PDCCH Physical Downlink Control Channel
PDSCH Physical Downlink Shared Channel
PUCCH Physical Uplink Control Channel
PUSCH Physical Uplink Shared Channel
RAN Radio Access Network
RAT Radio Access Technology
RNC Radio Network Controller
RNTI Radio Network Temporary Identifier
RRC Radio Resource Control
RS Reference Signal
UE User Equipment
UL Uplink
UMTS Universal Mobile Telecommunication System
UTRAN Universal Terrestrial Radio Access Network
WCDMA Wide CDMA
WLAN Wide Local Area Network

The invention claimed is:

1. A method performed by a first network entity associated with a first airborne or orbital communication node for enabling at least one wireless device in a wireless communications network to switch from being served by a first service link of the first airborne or orbital communication node to being served by a second service link of a second airborne or orbital communication node, the method comprising:
    transmitting, to the at least one wireless device, information associated with a reference signal of a transmission beam transmitted over the second service link of the second airborne or orbital communication node, comprising information indicating the location over time of the second airborne or orbital communication node, wherein the at least one wireless device executes the switch from the first service link to the second service link instructed by the first network entity, and wherein at the time of the service link switch, the first airborne or orbital communication node uses Medium Access Control (MAC) Control Element (CE) to activate a spatial relation suitable for transmitting Physical Uplink Control Channel (PUCCH) to the second airborne or orbital communication node.

2. The method according to claim 1, further comprising:
    determining that the at least one wireless device being served by the first service link of the first airborne or orbital communication node are to switch to being served by the second service link of the second airborne or orbital communication node.

3. The method according to claim 1, wherein the information associated with a reference signal of a transmission beam transmitted over the second service link of the second airborne or orbital communication node is Transmission Configuration Indication (TCI) state information.

4. The method according to claim 3, wherein the reference signal is a Quasi Co-Located (QCL) source reference signal, and the TCI state information comprise QCL information indicating the QCL source reference signal identity and the location over time of the second airborne or orbital communication node.

5. The method according to claim 1, wherein the information indicating the location over time of the second airborne or orbital communication node is ephemeris information of the second airborne or orbital communication node, or an ephemeris identity indicating the ephemeris information of the second airborne or orbital communication node.

6. The method according to claim 1, further comprising:
    transmitting that the at least one wireless device being served by the first service link of the first airborne or orbital communication node are to switch to being served by the second service link of the second airborne or orbital communication node.

7. The method according to claim 3, further comprising:
    receiving, from one or more of the at least one wireless device, information indicating the capability of the wireless device for activating a TCI state according to the TCI state information within a time period.

8. The method according to claim 1, wherein the first network entity is partly or fully comprised in the first airborne or orbital communication node and/or partly or fully comprised located in an earth-based gateway in the wireless communication network.

9. A first network entity associated with a first airborne or orbital communication node for enabling at least one wireless device in a wireless communications network to switch from being served by a first service link of the first airborne or orbital communication node to being served by a second service link of a second airborne or orbital communication node, the first network entity comprising:
    processing circuitry; and
    memory circuitry storing instructions executable by the processing circuitry to transmit, to the at least one wireless device, information associated with a reference signal of a transmission beam transmitted over the second service link of the second airborne or orbital communication node, comprising information indicating the location over time of the second airborne or orbital communication node, wherein the at least one wireless device executes the switch from the first service link to the second service link instructed by the first network entity, and wherein at the time of the service link switch, the first airborne or orbital communication node uses Medium Access Control (MAC) Control Element (CE) to activate a spatial relation suitable for transmitting Physical Uplink Control Channel (PUCCH) to the second airborne or orbital communication node.

10. The first network entity according to claim 9, wherein the processing circuitry executing the instructions is further configured to:
    determine that the at least one wireless device being served by the first service link of the first airborne or orbital communication node are to switch to being served by the second service link of the second airborne or orbital communication node.

11. A method performed by a wireless device for enabling a switch from being served by a first service link of a first airborne or orbital communication node to being served by a second service link of a second airborne or orbital communication node in a wireless communications network, the method comprising:
    receiving, from a first network entity associated with the first airborne or orbital communication node, information associated with a reference signal of a transmission beam transmitted over the second service link of the second airborne or orbital communication node, comprising information indicating the location over time of the second airborne or orbital communication node, wherein the wireless device executes the switch from the first service link to the second service link instructed by the first network entity, and wherein at the time of the service link switch, the first airborne or orbital communication node uses Medium Access Control (MAC) Control Element (CE) to activate a spatial relation suitable for transmitting Physical Uplink Control Channel (PUCCH) to the second airborne or orbital communication node.

12. The method according to claim 11, further comprising:
    configuring the wireless device based on the received information.

13. The method according to claim 11, wherein the information associated with a reference signal of a transmission beam transmitted over the second service link of the second airborne or orbital communication node is Transmission Configuration Indication (TCI) state information.

14. The method according to claim 13, wherein the reference signal is a Quasi Co-Located (QCL) source reference signal, and the TCI state information comprise QCL information indicating the QCL source reference signal identity and the location over time of the second airborne or orbital communication node.

15. The method according to claim 11, wherein the information indicating the location over time of the second airborne or orbital communication node is ephemeris information of the second airborne or orbital communication node, or an ephemeris identity indicating the ephemeris information of the second airborne or orbital communication node.

16. The method according to claim 11, further comprising:
    receiving a multicast or broadcast message indicating to the wireless device to perform the switch from the first service link to the second service link; and
    performing the switch from the first service link to the second service link based on the received information associated with a reference signal of a transmission beam transmitted over the second service link of the second airborne or orbital communication node comprising information indicating the location over time of the second airborne or orbital communication node.

17. The method according to claim 16, wherein performing the switch from the first service link to the second service link comprises activating one or more TCI states according to the TCI state information in order to receive the reference signal of the transmission beam transmitted over the second service link of the second airborne or orbital communication node.

18. The method according to claim 11, further comprising:
    transmitting information indicating the capability of the wireless device for activating a TCI state according to the TCI state information within a time period.

19. A wireless device for enabling a switch from being served by a first service link of a first airborne or orbital communication node to being served by a second service link of a second airborne or orbital communication node in a wireless communications network, the wireless device comprising:
    processing circuitry; and
    memory circuitry storing instructions executable by the processing circuitry to:
    receive, from a first network entity associated with the first airborne or orbital communication node, information associated with a reference signal of a transmission beam transmitted over the second service link of the second airborne or orbital communication node, comprising information indicating the location over time of the second airborne or orbital communication node, wherein the wireless device executes the switch from the first service link to the second service link instructed by the first network entity, and wherein at the time of the service link switch, the first airborne or orbital communication node uses Medium Access Control (MAC) Control Element (CE) to activate a spatial relation suitable for transmitting Physical Uplink Control Channel (PUCCH) to the second airborne or orbital communication node.

20. The wireless device according to claim 19, wherein the processing circuitry executing the instructions is further configured to configure the wireless device based on the received information.

\* \* \* \* \*